United States Patent
Owens, Jr. et al.

(10) Patent No.: US 12,421,659 B1
(45) Date of Patent: Sep. 23, 2025

(54) FUNCTIONAL BRAIDED COMPOSITE YARNS FOR SENSING APPLICATIONS

(71) Applicant: Nautilus Defense LLC, Pawtucket, RI (US)

(72) Inventors: James B. Owens, Jr., Lincoln, RI (US); Zane A. Lewis, Foster, RI (US)

(73) Assignee: NAUTILUS DEFENSE LLC, Pawtucket, RI (US)

(*) Notice: Subject to any disclaimer, the term of this patent is extended or adjusted under 35 U.S.C. 154(b) by 433 days.

(21) Appl. No.: 17/353,596

(22) Filed: Jun. 21, 2021

Related U.S. Application Data

(60) Provisional application No. 63/041,583, filed on Jun. 19, 2020.

(51) Int. Cl.
   *D07B 1/14* (2006.01)
   *G01L 5/101* (2020.01)
   *G01L 5/165* (2020.01)

(52) U.S. Cl.
   CPC .............. *D07B 1/147* (2013.01); *G01L 5/101* (2013.01); *G01L 5/165* (2013.01); *D10B 2401/16* (2013.01)

(58) Field of Classification Search
   CPC ......... G01L 5/101; G01L 5/165; D07B 1/147; D10B 2401/16
   USPC .......................................................... 73/796
   See application file for complete search history.

(56) References Cited

U.S. PATENT DOCUMENTS

| | | |
|---|---|---|
| 2,114,496 A | 4/1938 | Keating |
| 3,014,087 A | 12/1961 | Kaplan et al. |
| 4,819,914 A * | 4/1989 | Moore ................... A01K 3/005 |
| | | 256/45 |

(Continued)

FOREIGN PATENT DOCUMENTS

| | | | |
|---|---|---|---|
| DE | 69732664 T2 * | 4/2006 | .......... B29C 70/222 |
| DE | 102006051001 A1 | 4/2008 | |

(Continued)

OTHER PUBLICATIONS

"DuPont(TM) Kevlar(R) 49 Aramid Fiber", http://www.matweb.com/search/datasheet.aspx?MatGUID=77b5205f0dcc43bb8cbe6fee7d36cbb5&ckck=1, Downloaded Dec. 8, 2021.

(Continued)

*Primary Examiner* — Octavia Hollington
(74) *Attorney, Agent, or Firm* — Philip D. Askenazy; Peacock Law P.C.

(57) ABSTRACT

Braided composite yarns including one or more functional components such as conductors and one or more structural components such as para-aramid fibers, and methods of manufacture therefor. Bundles of at least one functional component and at least one structural component undergo simultaneous parallel winding under tension onto a single bobbin prior to braiding, thus reducing the mechanical loading forces on the functional components in the final yarn. The yarns can be engineered with application-specific electrical, electronic, electromagnetic, or physical properties that enable their use as electronic components or sensors, and attached to or incorporated into active textiles and composite substrates. Such yarns can be used to measure elongation, compression, twist, and other properties of a braided object in which they are incorporated.

14 Claims, 16 Drawing Sheets

(56) References Cited

U.S. PATENT DOCUMENTS

| | | | | |
|---|---|---|---|---|
| 4,973,029 | A | * | 11/1990 | Robbins, III .......... A01K 3/005 264/171.18 |
| 5,036,166 | A | * | 7/1991 | Monopoli .............. H01B 5/008 174/128.1 |
| 5,058,818 | A | | 10/1991 | Haehnel et al. |
| 5,392,683 | A | | 2/1995 | Farley |
| 5,741,332 | A | * | 4/1998 | Schmitt ..................... D04C 1/06 623/1.53 |
| 5,809,861 | A | | 9/1998 | Hummel |
| 5,901,632 | A | | 5/1999 | Ryan |
| 5,906,004 | A | | 5/1999 | Lebby et al. |
| 5,931,076 | A | | 8/1999 | Ryan |
| 6,210,771 | B1 | | 4/2001 | Post et al. |
| 6,341,550 | B1 | | 1/2002 | White |
| 6,727,197 | B1 | * | 4/2004 | Wilson ..................... D04C 1/02 87/8 |
| 7,240,599 | B2 | | 7/2007 | Nolan |
| 7,516,605 | B2 | | 4/2009 | Goldwater et al. |
| 7,576,286 | B2 | * | 8/2009 | Chen ..................... D03D 1/0043 174/117 M |
| 7,770,837 | B1 | * | 8/2010 | Head ..................... B65H 18/28 242/417.3 |
| 7,954,746 | B1 | * | 6/2011 | Head ..................... B65H 18/28 242/417.3 |
| 8,555,472 | B2 | * | 10/2013 | Cavallaro ............... D06M 7/00 139/408 |
| 8,859,088 | B2 | * | 10/2014 | Broughton, Jr. ......... D04C 1/06 428/221 |
| 8,918,970 | B2 | * | 12/2014 | Hayse .................. D03D 13/004 28/143 |
| 9,181,642 | B2 | * | 11/2015 | Cahuzac ................. D04C 3/00 |
| 9,433,489 | B2 | | 9/2016 | Reilly et al. |
| 9,481,948 | B2 | * | 11/2016 | Branscomb ............ D02G 3/442 |
| 9,745,679 | B2 | * | 8/2017 | Zhang ..................... F16L 53/38 |
| 10,182,760 | B2 | | 1/2019 | Nicoletti et al. |
| 10,487,423 | B2 | | 11/2019 | Riethmüller et al. |
| 10,555,581 | B2 | | 2/2020 | Bruce et al. |
| 10,557,220 | B2 | | 2/2020 | Fu et al. |
| 11,873,590 | B1 | * | 1/2024 | Williams ................. D04C 1/12 |
| 2003/0056599 | A1 | | 3/2003 | Van et al. |
| 2003/0205041 | A1 | * | 11/2003 | Baker Jr. ................. D02G 3/36 57/224 |
| 2005/0082083 | A1 | * | 4/2005 | Nolan .................... A01K 3/005 174/128.2 |
| 2005/0229770 | A1 | | 10/2005 | Smeets et al. |
| 2006/0148355 | A1 | * | 7/2006 | Davis .................... F16H 57/032 442/205 |
| 2006/0211934 | A1 | * | 9/2006 | Hassonjee ............. D02G 3/441 600/372 |
| 2008/0091097 | A1 | | 4/2008 | Linti et al. |
| 2009/0176427 | A1 | * | 7/2009 | Hansen .................. D21F 3/0227 442/184 |
| 2010/0077528 | A1 | | 4/2010 | Lind et al. |
| 2010/0229456 | A1 | | 9/2010 | Nakanishi |
| 2012/0108699 | A1 | * | 5/2012 | Fang ....................... C08J 5/249 523/400 |
| 2014/0157974 | A1 | * | 6/2014 | Cahuzac ................. D04C 3/00 87/33 |
| 2014/0172096 | A1 | | 6/2014 | Koob et al. |
| 2014/0377488 | A1 | * | 12/2014 | Jamison ................. D04C 1/10 428/221 |
| 2016/0284436 | A1 | | 9/2016 | Fukuhara et al. |
| 2016/0326675 | A1 | | 11/2016 | Kinugasa |
| 2017/0035149 | A1 | * | 2/2017 | Bruce ..................... D04C 3/38 |
| 2017/0107647 | A1 | | 4/2017 | Riethmüller et al. |
| 2017/0232538 | A1 | | 8/2017 | Robinson et al. |
| 2017/0233903 | A1 | | 8/2017 | Jeon |
| 2018/0087191 | A1 | | 3/2018 | Threlkeld |
| 2018/0087193 | A1 | | 3/2018 | Fu et al. |
| 2018/0255639 | A1 | | 9/2018 | Bergman et al. |
| 2018/0363175 | A1 | * | 12/2018 | Bayraktar ............... D04C 1/12 |
| 2019/0021407 | A1 | | 1/2019 | Howland |
| 2019/0062951 | A1 | * | 2/2019 | Rizk ..................... B29C 55/005 |
| 2019/0079582 | A1 | | 3/2019 | Lyons et al. |
| 2019/0327832 | A1 | | 10/2019 | Holbery et al. |
| 2020/0125195 | A1 | | 4/2020 | Tremmel et al. |
| 2020/0270775 | A1 | | 8/2020 | Oppenheim |
| 2020/0325603 | A1 | | 10/2020 | King et al. |
| 2021/0008815 | A1 | * | 1/2021 | Huoponen ............ B29C 70/543 |
| 2021/0206481 | A1 | | 7/2021 | Brion et al. |
| 2021/0277544 | A1 | | 9/2021 | King et al. |
| 2022/0056619 | A1 | | 2/2022 | Owens et al. |

FOREIGN PATENT DOCUMENTS

| | | | | |
|---|---|---|---|---|
| DE | 102017123922 | A1 | * | 4/2019 ............ C03C 13/00 |
| EP | 0290977 | A1 | | 11/1988 |
| EP | 0482489 | A1 | | 4/1992 |
| EP | 1537264 | B1 | | 5/2006 |
| FR | 2625599 | A1 | | 7/1989 |
| FR | 2755577 | A1 | * | 5/1998 ............ A01K 3/005 |
| JP | 4174 | | | 3/1939 |
| JP | H01300834 | A | * | 12/1989 |
| JP | H0623558 | U | * | 3/1994 |
| JP | H10168699 | A | | 6/1998 |
| JP | 2004115995 | A | | 4/2004 |
| JP | 3111295 | U | | 6/2005 |
| JP | 2006198939 | A | * | 8/2006 |
| JP | 2013144009 | A | * | 7/2013 |
| JP | 2014070286 | A | * | 4/2014 |
| JP | 2019112862 | A | * | 7/2019 |
| KR | 820001435 | B1 | * | 8/1982 |
| KR | 101015563 | B1 | | 2/2011 |
| KR | 20120010028 | A | * | 2/2012 |
| KR | 20170130534 | A | * | 11/2017 |
| RU | 2569839 | C1 | * | 11/2015 |
| WO | WO-9820505 | A1 | * | 5/1998 ............ A01K 3/005 |
| WO | 2010058360 | | | 5/2010 |
| WO | 2013000995 | A1 | | 1/2013 |
| WO | 2014135850 | | | 9/2014 |
| WO | 2019143694 | A1 | | 7/2019 |
| WO | 2020131634 | A1 | | 6/2020 |

OTHER PUBLICATIONS

Adumitroaie, Adi, et al., "Stiffness and strength prediction for plain weave textile reinforced composites", Mechanics of Advanced Materials and Structures, vol. 19, 2012, 169-183.

Allaoui, S., et al., "Mechanical and electrical properties of a MWNT/epoxy composite", Composites Science and Technology, vol. 62, 2002, 1993-1998.

Cheng, M., et al., "Experimental investigation of the transverse mechanical properties of a single Kevlar(R) KM2 fiber", International Journal of Solids and Structures, vol. 41, 2004, 6215-6232.

English, S A., et al., "A micro to macro approach to polymer matrix composites damage modeling", Sandia Report SAND2013-10666, Dec. 2013.

English, S., et al., "Material Characterization with Representative Volume Simulations of Woven Polymer Matrix Composites", The 19th International Conference on Composite Materials, 2013.

Li, S., et al., "Boundary conditions for unit cells from periodic microstructures and their implications", Composites Science and Technology, vol. 68, 2008.

Nayak, S., et al., "A microstructure-guided numerical approach to evaluate strain sensing and damage detection ability of random heterogeneous sel-sensing structural materials", Computational Materials Science, vol. 156, 2019, 195-205.

Potluri, P., et al., "Developments in Braided Fabrics", Specialist yarn and fabric structures. Developments and Applications, ed. R.H. Gong, Woodward Publishing Ltd., United Kingdom, 2011, 333-353.

Tang, X., et al., "Progressive Failure Behaviors of 2D Woven Composites", Journal of Composite Materials, vol. 37, 2003, 1239-1259.

Wang, L., et al., "Progressive failure analysis of 2D woven composites at the meso-micro scale", Composite Structures, vol. 178, 2017, 395-405.

Xia, Z., et al., "On selection of repeated unit cell model and application of unified periodic boundary conditions in micro-

(56) References Cited

OTHER PUBLICATIONS mechanical analysis of composites", International Journal of Solids and Structures, vol. 43, 2006, 266-278.

Patel, et al., "Applications of electrically conductive yarns in technical textiles", 2012 IEEE International Conference on Power System Technology (Powercon), Auckland, New Zealand, 2012, 1-6.

Zhao, et al., "3D braided yarns to create electrochemical cells", Electrochemistry Communications, vol. 61, 2015, 27-31.

* cited by examiner

FUNCTIONAL BRAIDED COMPOSITE YARNS FOR SENSING APPLICATIONS

CROSS-REFERENCE TO RELATED APPLICATIONS

This application claims priority to and the benefit of the filing of U.S. Provisional Patent Application No. 63/041,583, entitled "Functional Braided Composite Yarn", filed on Jun. 19, 2020, the entirety of which is incorporated herein by reference.

BACKGROUND OF THE INVENTION

Field of the Invention (Technical Field)

The present invention relates generally to braided composite yarns or threads, including conductive yarns or threads, that for example can be used in the construction of textile-integrated electronic systems (TIES). The braided composite yarns and threads of the present invention enable the integration of traditional electrical and electronic elements into textiles. They are compatible with sewing, embroidery, tailored fiber placement, and weaving and meet or exceed the operational requirements of both traditional and technical textiles and textile systems.

BACKGROUND ART

Note that the following discussion may refer to a number of publications and references. Discussion of such publications herein is given for more complete background of the scientific principles and is not to be construed as an admission that such publications are prior art for patentability determination purposes.

SUMMARY OF THE INVENTION (DISCLOSURE OF THE INVENTION)

An embodiment of the present invention is a braided composite yarn comprising one or more multicomponent fiber bundles, each one or more multicomponent fiber bundle comprising one or more functional components and at least one structural component. At least one of the one or more functional components preferably comprises a conductor and the conductor is preferably insulated. The conductor preferably comprises 44AWG copper wire insulated with layered polyurethane and/or polyamide insulation. The conductor optionally comprises a material with a sufficiently high resistivity and sufficiently low temperature coefficient of resistance to be suitable for resistive joule heating. At least one of the one or more functional components preferably comprises a material selected from the group consisting of plastic, glass, fiber optic material, nickel-titanium alloy, nickel-chrome alloy, extruded conductive polymer, conductive yarn, and piezoelectric yarn. The material optionally comprises an additive, coating, or plating to modify its electrical, mechanical, optical, surface, visual, or other properties. The at least one structural component preferably comprises a material selected from the group consisting of synthetic, natural, bonded para-aramid, meta-aramid, silica, quartz, nylon, polyester, cotton, and wool. The diameter of the at least one structural component is preferably at least approximately twice a diameter of the one or more functional components. The maximum elongation at break of the at least one structural component is preferably less than an elastic limit of the one or more functional components, preferably approximately less than 10%. The at least one structural component preferably flattens when the braided composite yarn is under tension. The one or more multicomponent fiber bundles are optionally braided together with additional structural components. The one or more functional components are preferably accessible at the surface of the braided composite yarn. The braided composite yarn is optionally configured to form at least a portion of one or more electronic or electromagnetic devices, and each device is preferably selected from the group consisting of inductor, capacitor, antenna, collapsible antenna structure, transmission line, inter-integrated circuit ($I^2C$) network, data network, serial data bus, ethernet network, power network, active heating element, power line, electromagnet, choke, transformer, sensor, capacitive touch sensor, strain sensor, distributed sensor network, sensor array, and filter. The one or more functional components of one of the one or more multicomponent fiber bundles optionally comprise two conductors which form a twisted pair transmission line. The braided composite yarn optionally comprises core, which preferably has one or more properties selected from the group consisting of solid, hollow, conducting, dielectric, insulating, ferromagnetic, superelastic, shape memory, and para-aramid. The core preferably limits deformation of the braided composite yarn under tension.

Another embodiment of the present invention is a method of using the braided composite yarn of claim 1, the method comprising incorporating the braided composite yarn into an active textile. The method optionally comprises sewing the braided composite yarn onto the active textile. The sewing step preferably comprises attaching the yarn to the active textile using straight sewn stitches of a top thread, which preferably comprises a spun or multifilament thread, preferably a meta-aramid thread. The stiches are preferably periodic, thereby forming mechanically isolated subdomains of the yarn. Adjacent stitches are preferably spaced approximately between 1 mm and 2 mm. The braided composite yarn is preferably loaded in the bobbin of a sewing or embroidery machine. The method alternatively comprises weaving the yarn into the warp or weft of the active textile. The method optionally comprises directly soldering the braided composite yarn to an electronic component or printed circuit board through-hole attached to the active textile, in which case the insulation is removed from at least one of the one or more functional components preferably using heat from a soldering device, without requiring stripping the insulation prior to soldering. The at least one structural component preferably has a higher decomposition temperature than a soldering temperature. The method preferably comprises encapsulating the electronic component directly to the active textile using epoxy potting compound, and preferably comprises routing the braided composite yarn using computer aided design (CAD), whereby the incorporating step comprises CNC embroidery, tailored fiber placement, or using a CNC machine.

Another embodiment of the present invention is a method of manufacturing a braided composite yarn, the method comprising winding in parallel one or more functional components and at least one structural component to form a first multicomponent fiber bundle; and braiding the first multicomponent fiber bundle with a second multicomponent fiber bundle and/or a structural component. The winding step preferably comprises winding the multicomponent fiber bundle onto a single braider bobbin. The winding step is preferably performed under tension. The braiding step optionally comprises loading a first braider bobbin comprising the first multicomponent fiber bundle and a second braider bobbin comprising a second multicomponent fiber bundle or a structural component in a braiding machine in a balanced half-carrier configuration. The braiding step preferably comprises using a braiding machine selected from the group consisting of rotary, lace, square, radial, biaxial, triaxial, two-dimensional, and three-dimensional. The braiding step optionally comprises incorporating a core in the braided composite yarn. The braiding step preferably comprises selecting a take-up rate of a braiding machine relative to a rotational rate of braider bobbin carriers and using one or more guide rings.

Another embodiment of the present invention is a triaxial composite braided object comprising one or more axial yarns, wherein at least one axial yarn comprises a multicomponent fiber bundle. The functional component of the multicomponent fiber bundle preferably has one or more properties selected from the group consisting of elastic, elastomeric, compressive, conductive, and capacitive. The triaxial composite braided object preferably comprises a plurality of axial yarns disposed across a width of the braided object. The axial yarns are preferably approximately parallel. The triaxial composite braided object is preferably capable of measuring compression and/or twist experienced by the triaxial composite braided object and preferably capable of providing the position or gradient along the width of the triaxial composite braided object of the compression and/or the twist experienced by the triaxial composite braided object, which thereby preferably changes a mutual capacitance between two axial yarns, two bias yarns, or one bias yarn and one axial yarn, each such yarn comprising a multicomponent fiber bundle. The triaxial composite braided object preferably comprises a plurality of bias yarns, wherein at least one bias yarn comprises a multicomponent fiber bundle. The functional component of the multicomponent fiber bundle in the at least one bias yarn is preferably conductive and/or capacitive. The triaxial composite braided object is preferably capable of measuring axial tension and/or elongation experienced by the triaxial composite braided object. The bias angle of the bias yarns preferably changes under axial tension and/or elongation of the triaxial composite braided object, thereby narrowing the triaxial composite braided object. The axial tension and/or elongation preferably changes the mutual capacitance between two axial yarns, two bias yarns, or one bias yarn and one axial yarn, each such yarn comprising a multicomponent fiber bundle.

Another embodiment of the present invention is a composite braided object comprising one or more bias yarns, wherein at least one bias yarn comprises a multicomponent fiber bundle. The functional component of the multicomponent fiber bundle is preferably conductive and/or capacitive. The composite braided object preferably comprises a least one elastomeric core. The composite braided object is preferably capable of measuring axial tension and/or elongation experienced by the composite braided object. The bias angle of the bias yarns preferably changes under axial tension and/or elongation of the composite braided object, thereby narrowing the triaxial composite braided object. The axial tension and elongation preferably changes the mutual capacitance between two bias yarns each comprising a multicomponent fiber bundle. The multicomponent fiber bundle optionally comprises intersecting or non-intersecting insulated conductors or non-intersecting uninsulated conductors.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1A:
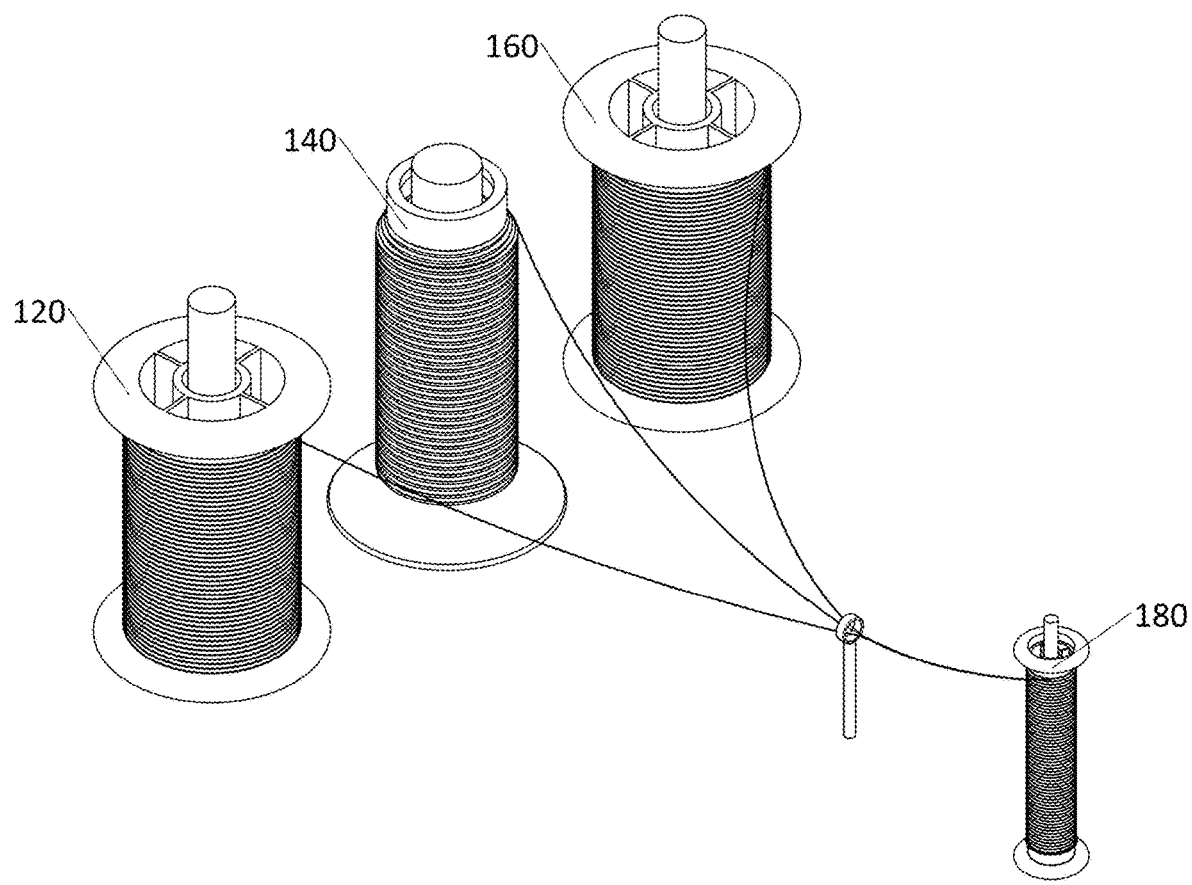
FIG. 1A illustrates a method of simultaneous parallel winding of a multicomponent fiber bundle of the present invention.

One or more embodiments of the present invention are preferably braided composite yarns and threads and methods of manufacture thereof, including the simultaneous parallel winding of one or more conductors and one or more structural yarns onto one or more bobbins, and loading the bobbins into a braiding machine to produce a coreless thread construction with mechanically captive conductors. Advantages of some embodiments of the present invention are: direct manipulation of individual conductors is unnecessary due to the high conductor content of the yarns or threads by volume, which enables direct soldering and the formation of mechanically and electrically sound solder joints; local removal of the conductors' insulation can be accomplished by the application of heat during the soldering process, allowing for the construction of textile integrated electronic systems with fully encapsulated routes; compatibility with both flexible and rigid PCB's with through-hole attachments; high mechanical and electrical reliability during high-rate manufacturing operations and during use; and compatibility with integrated electromagnetic structures, including twisted pair transmission lines, air and ferromagnetic-cored inductors, capacitors, and antennas.

As used throughout the specification and claims, the term "yarn" means yarn or thread. As used throughout the specification and claims, the term "structural", referring to a component fiber of a yarn, means load-bearing and providing mechanical structure and stability. As used throughout the specification and claims, the term "functional", referring to a component fiber of a yarn, means providing an electrical, electronic, optical, electromagnetic, sensing, heating, actuating, chemical, or physical function, and the like. As used throughout the specification and claims, the term "composite" means comprising both structural and functional components. As used throughout the specification and claims, the term "multicomponent fiber bundle" means one or more functional components and at least one structural component that are co-wound in parallel together on a bobbin prior to braiding. As used throughout the specification and claims, the term "braided object" means a yarn, thread, tape, fabric, textile, and the like whose components are integrated through the braiding process. As used throughout the specification and claims, the term "helical" when describing a braided object means one wherein each bias yarn helically forms a spiral turning either clockwise or counterclockwise entirely along its entire length, without changing direction. As used throughout the specification and claims, the term "flat" when describing a braided object means one in which each bias yarn alternates between clockwise and counterclockwise. As used throughout the specification and claims, the term "active textile" means electrically active textile, electrically functional textile, e-textile, smart textile, textile integrated electronic system (TIES), soft system, functionalized soft system, composite system, structure-integrated system, smart textile, garment, and the like.

The braided composite yarns of the present invention allow for the selective location and interconnection of electronic devices across a surface area of a textile, enabling the development of functionalized soft and composite systems, for example smart textiles, composites with integrated structural health monitoring, or other devices that integrate traditional electrical, electronic, and electromagnetic capabilities directly into the construction of materials used traditionally for only mechanical purposes, suitable for mission-critical operations. By minimizing the textile integration costs and associated capability detractors incurred with the addition of electronic capabilities, the braided composite yarns allow for the exploration and development of a broad range of distributed soft and structure-integrated systems. Promising capabilities enabled by these braided composite yarns include distributed sensor networks, collapsible antenna structures, structure-integrated data and power networks, structure-integrated active heating, and broad area conformal sensor arrays.

The braided composite yarns of the present invention are preferably engineered to strike a balance between the disparate requirements of textile and electronic systems without adversely impacting the system's textile or electrical performance characteristics. They are preferably compatible with traditional textile and electronic manufacturing methods and machinery, enabling their application at scale.

Figure 1B:
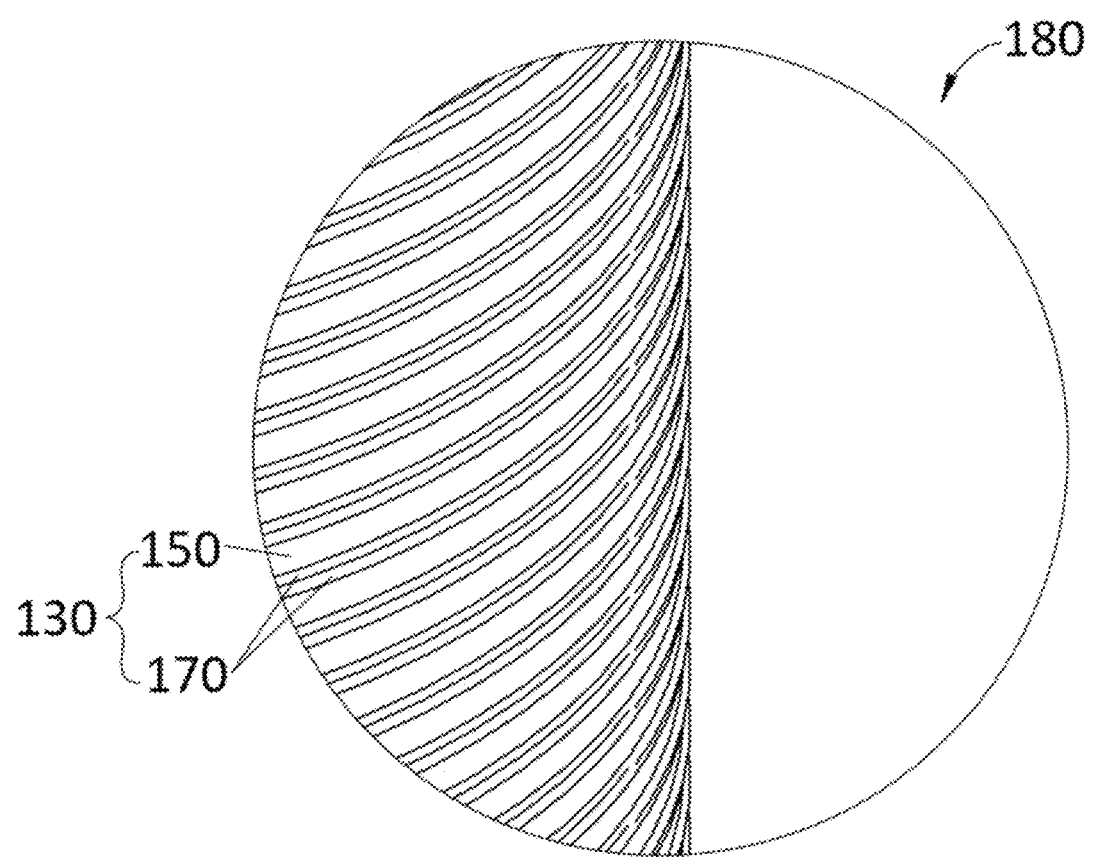
FIG. 1B shows a closeup of the multicomponent fiber bundle of FIG. 1A wound on a braider bobbin.

As shown in FIG. 1A, an embodiment of a multicomponent fiber bundle of the present invention is manufactured as follows. Functional components, for example insulated copper wire (preferably 44AWG) are wound on spools 120, 160. Center spool 140 is wound with a structural component, for example bonded Tex 21 para-aramid (Kevlar®) yarn. Functional components from spools 120, 160 and structural component from spool 140 are preferably simultaneously co-wound in parallel onto a single braider bobbin 180, preferably using a parallel winding machine, to form continuous multicomponent fiber bundle 130, shown in the close-up of braider bobbin 180 in FIG. 1B. The parallel co-winding is preferably performed under tension, and multicomponent fiber bundle 130 remains in tension on braider bobbin 180, so that the functional components in the multicomponent fiber bundle do not separate from the structural components in subsequent manufacturing steps. In the embodiment shown in FIGS. 1A-1B, multicomponent fiber bundle 130 comprises two functional components 170 and one structural component 150. However, a multicomponent fiber bundle may comprise any number of functional components and any number of structural components. Multiple discrete conductors provide redundancy for greater systems reliability and increased current carrying capacity. The simultaneous parallel winding of the conductors and para-aramid yarns to form a multicomponent fiber bundle prior to the braiding process reduces the twist and resultant stresses the conductors are exposed to, both during and after manufacture.

Figure 2:
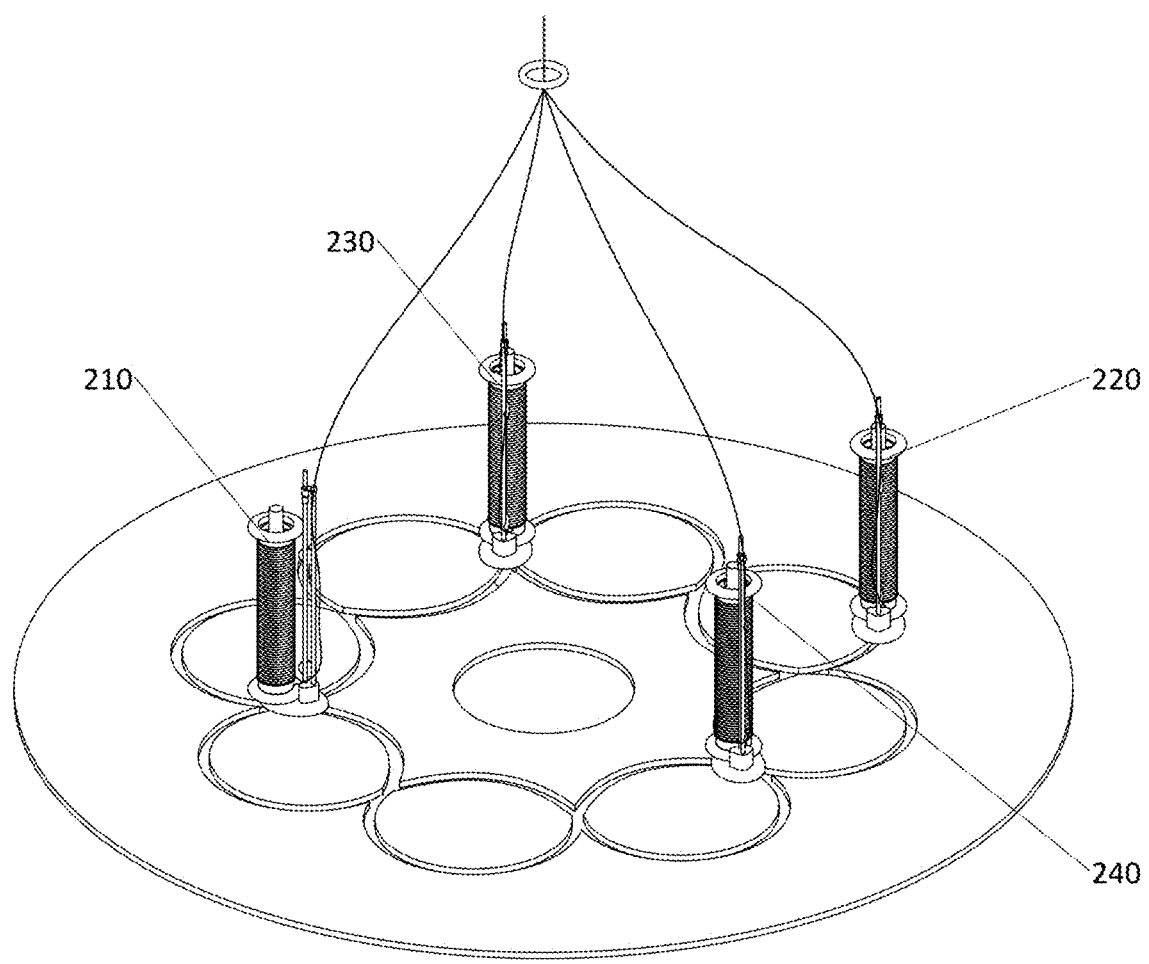
FIG. 2 illustrates a method of braiding a braided composite yarn of the present invention.

As shown in FIG. 2, in one embodiment four braider bobbins 210, 220, 230, 240 are prepared in a similar manner, after which they are preferably loaded into a maypole braiding machine in a balanced quarter-carrier configuration such that bobbins 210, 220 are traveling clockwise and bobbins 230, 240 are traveling counterclockwise in a serpentine motion. In other embodiments, other configurations, including but not limited to a half-carrier configuration, may be used. The braider then forms a helically intertwined yarn structure with mechanically captive functional components and with minimal twist and a small braid angle, preferably without the use of a core or mandrel. Any number of such braider bobbins may be used, and the braider bobbins may comprise the same or different multicomponent fiber bundles. One or more other optional bobbins comprising only structural materials may optionally be additionally loaded on the braiding machine as required to braid a yarn with the desired thread size and construction. Although this configuration produces a biaxial or two-dimensional (2D) braid, embodiments of the present invention can be manufactured on a triaxial or three-dimensional (3D) braiding machine.

The resultant braided composite yarn provides inherent strain relief to the embedded functional components by limiting their range of motion within the yarn's construction. The braid kinematics of these yarns are such that their diameter decreases when under tension, applying compressive forces perpendicular to the longitudinal axis of the multicomponent fiber bundles. This contributes to the structural components serving as the principal load-bearing components, protecting the functional components from undesirable loading and damage. The functional materials are preferably held captive to the structural members, enabling a stable construction which is mechanically consistent through textile manufacturing processes and in use. The ratio of structural components to functional components can be varied to tailor the mechanical or electrical characteristics of the yarns as required for the intended application.

Also contributing to the mechanical protection of the functional materials contained within the braided composite yarns of the present invention is the selection of structural components, which are preferably at least twice the diameter of the incorporated functional components. This aids in protecting the functional components from abrasion and bend radii that could lead to fracturing. The maximum elongation of the structural components before failure is preferably less than the elastic limit of the functional components, thus ensuring that the braided composite yarn will not fail due to deformation or fatigue and subsequent degradation of the functional components. The structural components therefore serve as the yarn's principal load-bearing components, protecting the conductors or other functional components from undesirable stress and damage. This feature, combined with the kinematics of the braided structure, ensures that the functional materials will not experience plastic deformation or failure while the braided composite yarn is under tension. These features preferably enable a stable construction which is mechanically consistent through textile manufacturing processes including sewing, embroidery, and weaving, as well as during operational use.

When possible, bonded yarns or yarns constructed from a plurality of continuous filaments are preferable for use as the structural components in the composite braided yarns of the present invention. However, the structural components can comprise any material required to achieve the desired mechanical properties for the application of interest. Many of these materials such, as para-aramids, have an elongation at break of less than 10% because of their molecular crystallinity and structural continuity. A bonding agent applied to the surface of the twisted continuous filaments within the structural components ensures that the structural components maintain a uniform geometry during manufacturing. This does not significantly restrict the material's ability to flatten or otherwise deform when the braided composite yarn is under tension, which contributes to the ability of the structural components to restrict the movement of the functional components without imparting strain to the functional components. This effect is also aided by the parallel integration of the functional materials along the length of the structural materials within each multicomponent fiber bundle.

The braided composite yarns of the present invention are preferably coreless to reduce their diameter, enabling applications that can't be addressed with existing conductive yarns. In addition, unlike existing yarns in which the conductor is at the core, the braided composite yarns of the present invention enable direct access to the functional materials, for example conductors, for interconnection at the exterior of the yarn.

The braided composite yarns of the present invention may be engineered for a variety of applications through selection of their functional and structural materials and varying the content ratio of the materials. For example, some embodiments of the present invention are engineered for the transmission and reception of data and power, enabling the construction of textile-integrated electrical systems. For this application the yarn preferably comprises discrete 44AWG copper, copper alloy, or copper-plated conductors with layered polyurethane and polyamide insulation, and bonded Tex 21 para-aramid yarns. Beyond textile-integrated data and power networks, by utilizing other functional materials and structures, such as alloys engineered to exhibit a low temperature coefficient of resistance (such as Nichrome) or superelasticity (such as Nitinol), the yarns can be used for applications such as heating, actuation and sensing. Different structural materials may be selected to achieve the desired mechanical characteristics of the yarn to be produced.

Braided composite yarns of the present invention are preferably functional as continuous yarns and can be selectively integrated directly into the warp or weft of a woven fabric during construction. These functionalized woven fabrics can be used in the construction of garments, rigid composites, flexible composites, or any other system which incorporates a woven textile and where additional electrical, electronic, or electromagnetic capabilities provide value. Similarly, braided composite yarns can be incorporated as members of larger braided constructions for use in the construction of flexible and rigid composite materials.

Braided composite yarns can be designed with integrated electromagnetic and electronic structures by selectively incorporating functional materials fiber processing paths within the braid. The geometry of these fiber paths can be varied through modifying the diameter of the core material incorporated (if used), the diameter and quantity of the structural components, the take-up rate of the braider relative to the rotational rate of the carriers, the use of, quantity, diameter, and position of guide rings, and the angle at which the braided multicomponent fiber bundles interlace. The quantity and type of functional materials can then be selected to create braided composite yarns with engineered electromagnetic and electronic structures, including inductors, capacitors, antennas, and transmission lines. Braided composite yarns of the present invention can also be connected electrically in parallel, leveraging the surface area of a textile to further distribute and increase the current-carrying capacity of integrated textile circuits.

The routes which the braided composite yarns take on a textile, forming for example the integrated textile data and power networks, and interconnection locations thereon may be designed using computer aided design (CAD). These designs are then preferably imported into digitizing software, where the proper stitches and sequencing are configured for each route and translated into a file format used by CNC embroidery, tailored fiber placement, or CNC machines. Preferably only traditional straight stitches are employed to create these routes, enabling commercially available large-format CNC sewing and quilting machines to be employed in their construction. In addition, the braided composite yarns of the present invention are secured preferably using only traditional straight sewn stitches without the need for creating any three-dimensional stitches. The sewn stitch construction employed also preferably aids in mechanical stitch-to-stitch isolation by forming mechanical subdomains along the length of the integrated braided composite yarn. This benefit is also observed when incorporating braided composite yarns into woven fabrics.

Soldering is the preferred method of forming reliable, permanent electromechanical interconnections. The braided composite yarns of the present invention can be soldered directly to electronic components using both traditional and application-specific interconnection methods. This is preferably enabled by the conductor content of the yarn, the high decomposition temperature of structural materials such as para-aramid, and the conductors' polymeric insulation, which is removable with the application of heat, thereby eliminating the need for a secondary mechanical or chemical stripping process to gain access to the conductors. The construction of the braided composite yarns also enables access to the conductors at their exterior for reliable interconnections with low gap distance between the conductors and the electronic components to be soldered to, unlike typical solderable conductive yarns that incorporate the conductors at their core or below layers that require removal. The high wetting capability and low surface tension of typical solder allows it to flow and conform to the conductors incorporated within the braided composite yarns.

Braided composite yarns can be soldered directly to traditional PCB through-holes to form solder joints with integrated mechanical strain relief. Although many different methods for such soldering may be used, in one embodiment, a loop of braided composite yarn is formed at the desired connection location through stitching or other mechanical means. This loop is inserted into the PCB through the hole to which the yarn is to be connected. A piece of solderable material, such as tinned copper wire or copper braid, is passed through the loop and preferably tied to the loop to aid thermal transfer to all conductors contained within the braided composite yarn. Any remaining slack is preferably removed from the loop to limit its movement. The materials to be interconnected are then heated to the solder melting point, typically 376 degrees Celsius. Solder flows at the joint to create a local solder bath, preferably contacting all conductors present at the interconnection location. Finally, the heat source is removed and the joint is allowed to cool and solidify before being subjected to motion.

The methods employed to design and produce systems using the braided composite yarns of the present invention allow for the selective location and interconnection of electronic devices across the surface area of the TIES textile, enabling the development of functionalized soft systems suitable for mission operations. By minimizing the textile integration costs and associated capability detractors incurred with the addition of electronic capabilities, these methods allow for the exploration and development of a broad range of distributed soft systems, such as garment and structure-integrated distributed sensor networks, physiological monitoring systems, actuator networks, collapsible antenna structures, data and power networks, active heating, and broad area conformal sensor arrays. All yarns and threads are preferably constructed using domestically manufactured materials and preferably are fully Berry compliant.

The braided composite yarns of the present invention enable the integration of traditional electrical, electronic, and electromagnetic elements into textiles using methods and materials which minimally impact the textile substrate's operational performance and maintainability, can be used in textile-integrated power distribution networks, can form directly soldered interconnections to traditional electronic components without mechanical degradation or secondary processes, can be used as textile-integrated inter-integrated circuit ($I^2C$), SPI, and USB2.0 (or higher) serial data buses and ethernet networks for device to device communications (which have been demonstrated at up to 50' using a single thread), can be used for textile-based capacitive touch inputs, can form textile-integrated antenna structures for wireless power and data transfer, can provide thread-based capacitance and strain sensing, can form textile-integrated heating networks, enable shielding and concealment of the yarns using seams, tapes, and lamination techniques, are compatible with textile-adhered local encapsulation of rigid components, enable the distributed, scalable integration of traditional electronic components into a flexible textile system, and are preferably engineered for use with traditional textile and electronics manufacturing and integration methods.

Systems of the present invention preferably have one or more of the following advantages: direct manipulation of individual conductors is unnecessary due to the conductor content by volume to allow for direct soldering (note that conductors are preferably grouped and terminated in pairs if using a single thread as a transmission line); solder joints are mechanically and electrically sound due to the strain relief provided by the structural components and the high conductor content of the yarns; local removal of the conductors' insulation is achieved through the application of heat during the soldering process, allowing for fully encapsulated routes; compatibility with both flexible and rigid PCB's with through-hole attachments; conductor mechanical loading is minimized through braided construction, low elongation of structural materials, and the relationship between the functional and structural materials' diameters; and enabling the manufacture of engineered electromagnetic structures including twisted pair transmission lines, air and ferromagnetic-cored inductors, capacitors (possibly incorporating a twisted core of fine PTFE-insulated wire, similar to a "gimmick" capacitor), and antennas.

TIES can be utilized to build rapidly deployable functional structures, distributed conformal sensor networks, and functionalized composite materials. Using a custom roll-to-roll CNC sewing machine these systems can be constructed at continuous length for a variety of applications. In addition to wherever textiles are traditionally employed, TIES can add novel capabilities to systems requiring mechanical strength, durability, and persistent flexibility, the ability to pack into a small volume, and the ability to rapidly and repeatedly change geometry and volume.

EXAMPLES

Example 1

Figure 3A:
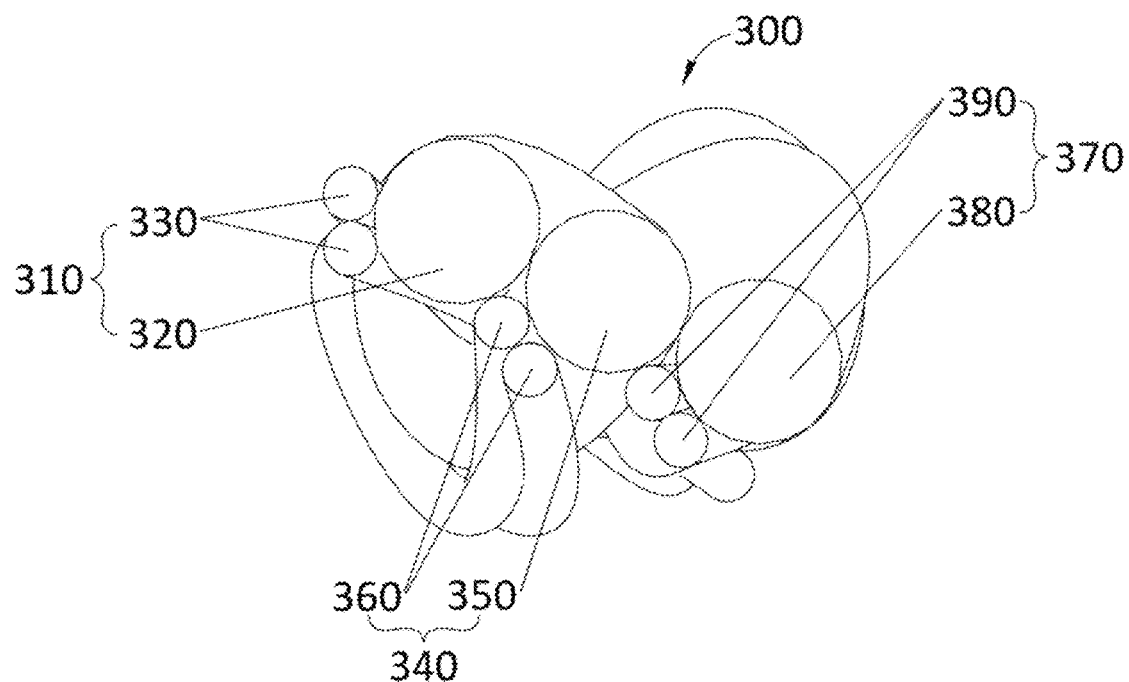
FIG. 3A is an end view of a braided composite yarn of the present invention.
Figure 3B:
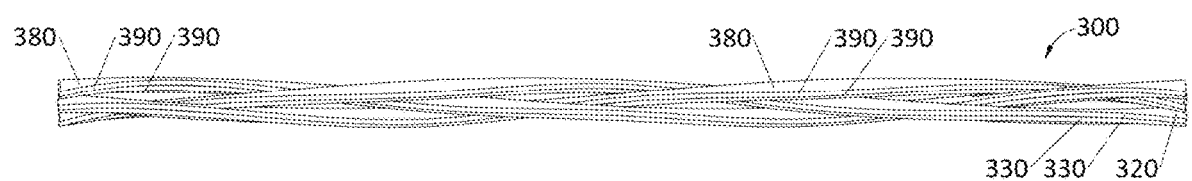
FIG. 3B is a top view of the braided composite yarn of FIG. 3A.

As shown in FIGS. 3A and 3B, braided composite yarn 300 of the present invention was braided from three multicomponent fiber bundles 310, 340, 370, each comprising two 44AWG copper conductors 330, 360, 390, respectively, insulated with layered polyurethane and polyamide insulation, as the functional components, and one Tex 21 bonded Kevlar® yarn 320, 350, 380, respectively, as the structural components.

Example 2

Figure 4A:
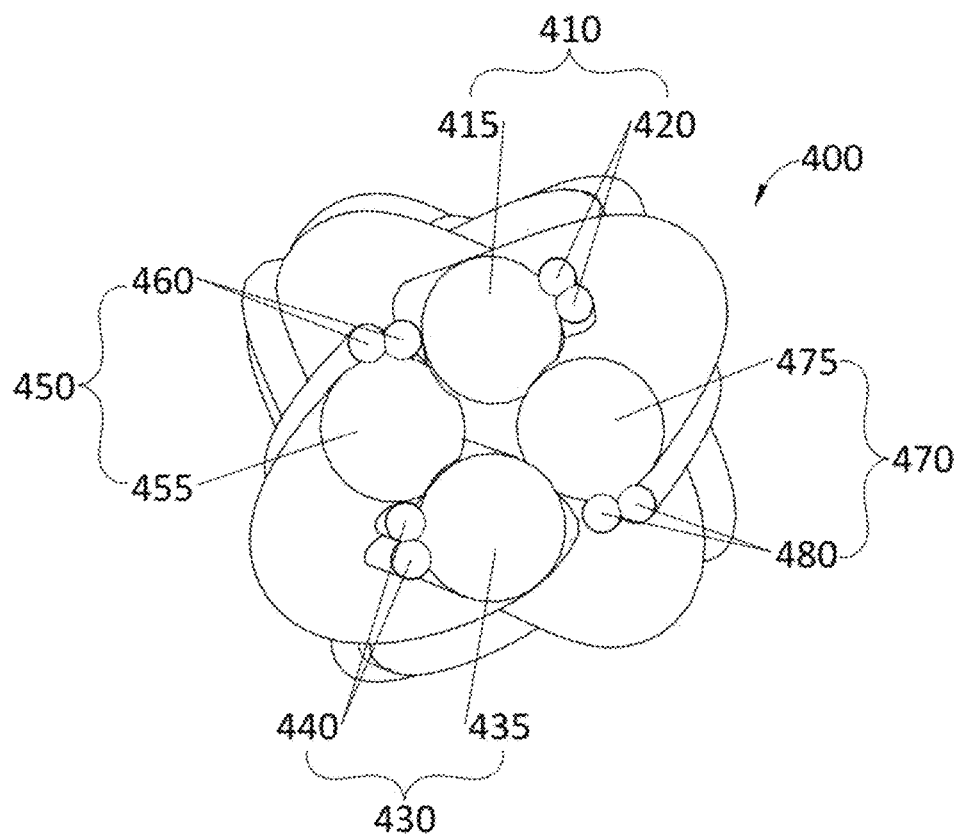
FIG. 4A is an end view of a braided composite yarn of the present invention.
Figure 4B:
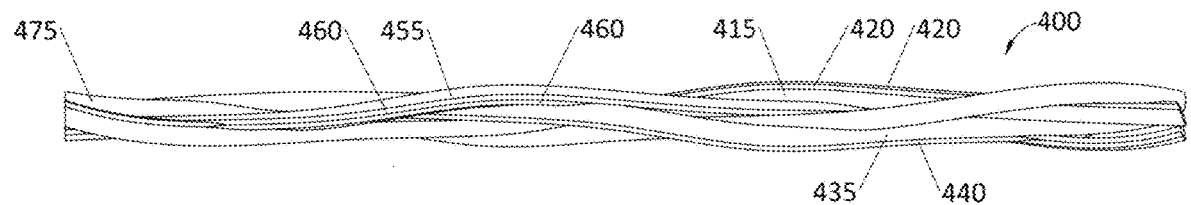
FIG. 4B is a top view of the braided composite yarn of FIG. 4A.

As shown in FIGS. 4A and 4B, braided composite yarn 400 of the present invention was braided from four multicomponent fiber bundles 410, 430, 450, 470, each comprising two 44AWG copper conductors 420, 440, 460, 480, respectively, insulated with layered polyurethane and polyamide insulation, as the functional components, and one Tex 21 bonded Kevlar® yarn 415, 435, 455, 475, respectively, as the structural components. This configuration forms two pairs of multiconductor twisted pairs, which can be used for differential signaling applications such as RS422 and Ethernet, or alternatively to form power and signal pairs in a single braided composite yarn. This configuration was capable of transmitting 10 mbps over 50 ft and 100 mpbs at 6 ft using a single yarn.

Example 3

Figure 5:
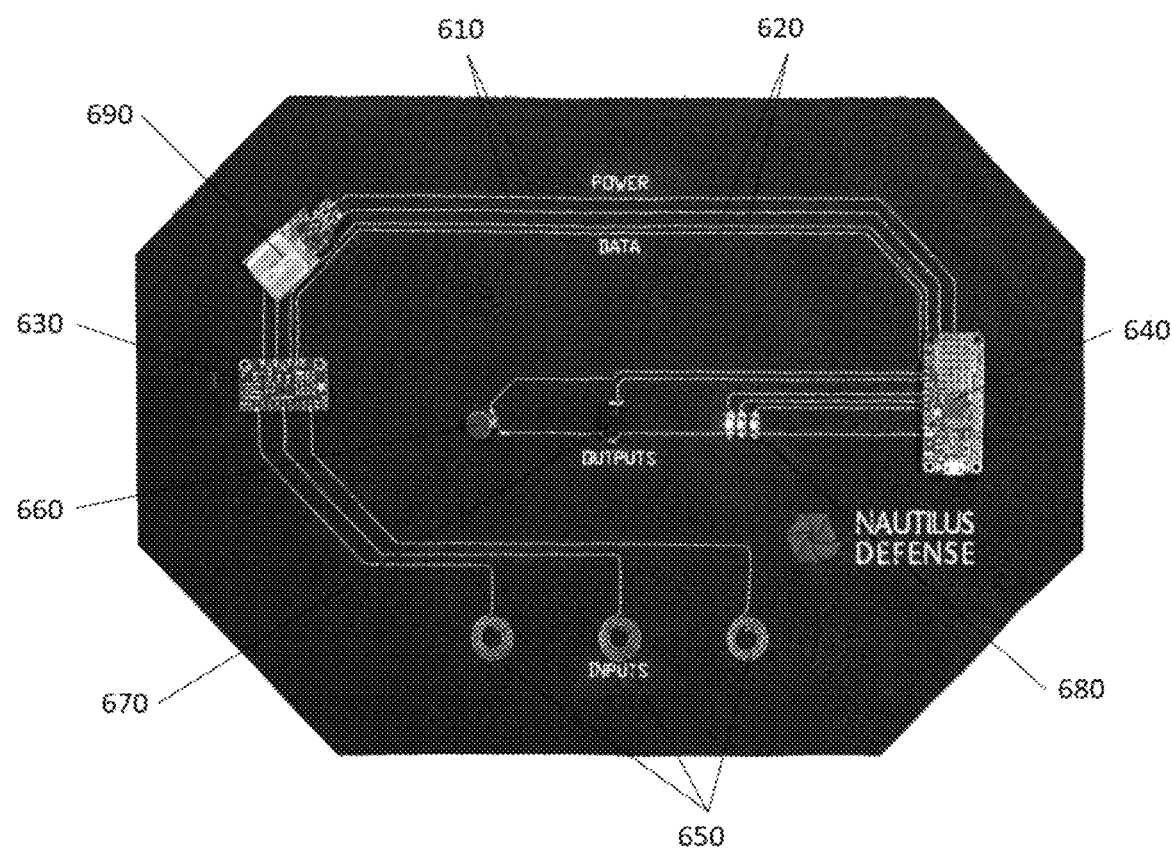
FIG. 5 is a photograph of braided composite yarns of the present invention routed and sewed to a TIES textile.
Figure 6:
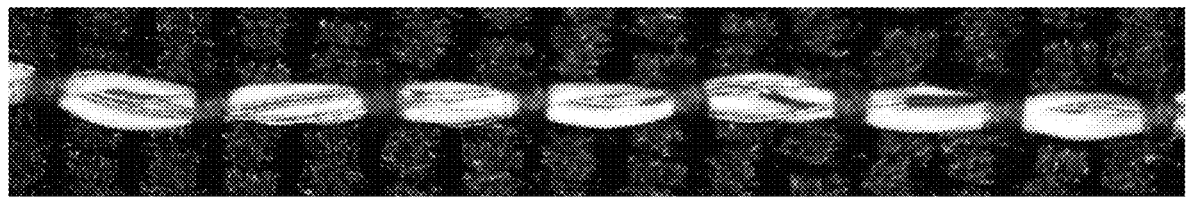
FIG. 6 is a closeup of FIG. 5 detailing the attachment of a braided composite yarn to the TIES textile.

FIG. 5 shows routes of straight stitch braided composite yarn of Example 2 applied to a 1000 denier Nylon Cordura® woven textile of a TIES prototype using a CNC embroidery machine. Tex 27 spun Nomex® meta-aramid thread was used as the top thread for its mechanical structure and performance. The spun construction enabled the thread to flatten when capturing the composite braid, distributing tension across a broader surface area than a bonded or monofilament thread would, thus preventing undue stress on the conductors in the composite braid. The braided composite yarn was loaded exclusively in the bobbin mechanism of the embroidery machine, which formed a series of loops interlaced with the top thread, to ensure the yarn underwent minimal strain during the manufacturing process. While the top thread typically experiences periods of compression when the needle is reversing direction, the braided composite yarn on the bobbin was always under tension, thus ensuring the formation of a reliable stich without any undesirable deformation to the functional components of the braided composite yarn. The braided composite yarns were used to form DC power lines 610 and inter-integrated circuit data networks 620 between two PCBs 630, 640. The yarns were also used as capacitive touch sensors 650 and to drive vibration motor 660, speaker 670, and LEDs 680. Battery 690 was also charged using power lines 610 when PCB 640 was connected to an external 5 VDC power source. Activation of each capacitive touch sensor operated the output device above that sensor for the duration of the touch for the left two capacitive touch sensors 650 and the vibration motor 660 and the speaker 670 respectively. Activation of the rightmost capacitive touch sensor 650 below LEDs 680 cycled through the sequential activation of one, two, three, and zero LEDs 680. All electronic components were soldered directly to the braided composite yarns. FIG. 6 shows a detail of the braided composite yarn sewn to the textile substrate of the TIES prototype using Tex 27 spun Nomex® thread.

Example 4

Figure 7:
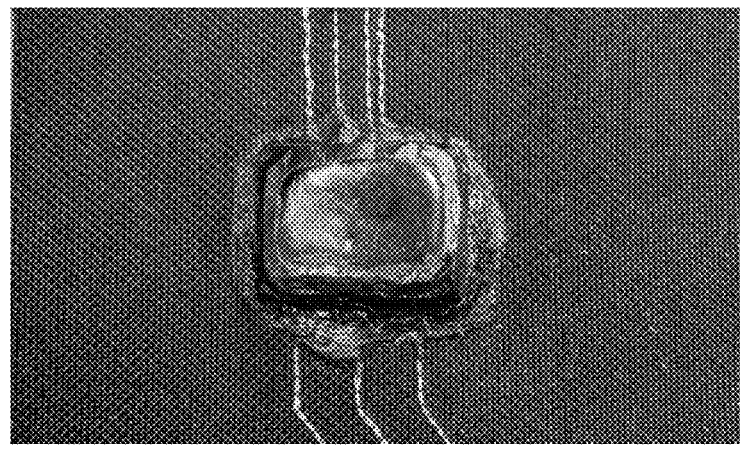
FIG. 7 is a photograph showing a printed circuit board (PCB) encapsulated directly to textile substrate using epoxy potting compound.

Environmental and physical protection of exposed electronic components and conductors is critical for the reliable fielding of systems. This can be achieved using conformal encapsulants such as epoxy potting compounds. Environmentally hardened enclosures can also be developed where access to the underlying electronics is of value to mission operations. FIG. 7 illustrates a PCB encapsulated directly to textile substrate using epoxy potting compound.

Example 5

Figure 8:
FIG. 8 is a photograph showing a woven textile comprising three braided composite yarns of the present invention woven in the weft of the fabric to form data, power, and ground lines for interconnection to discrete addressable light emitting diodes (LEDs).

As shown in FIG. 8, a woven textile was constructed comprising three braided composite yarns of Example 1 woven in the weft of the fabric. Terminating at the left side of the systems' electronics enclosure 800 are three braided composite yarns which form data, power, and ground lines for interconnection to discrete addressable red green blue (RGB) light emitting diodes (LEDs) 810. The braided composite yarn terminating at the right side of electronics enclosure 800 acts as a capacitive touch sensor, stepping LEDs 810 through a programmed color sequence with each touch. The upper and lower braided composite yarns woven into the weft that were originally present to the right of electronics enclosure 800 were cut and removed.

Example 6

Figure 9:
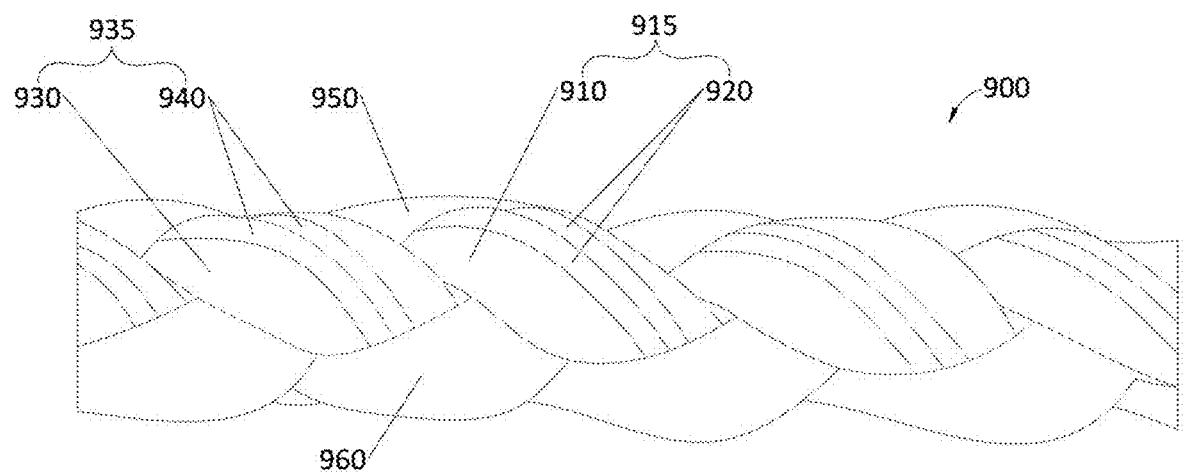
FIG. 9 shows a braided composite yarn of the present invention configured to form an inductor.

FIG. 9 shows a braided composite yarn of the present invention configured to form an inductor. Braided composite yarn 900 was braided from two Tex 21 bonded Kevlar® yarns 950, 960 and two multicomponent fiber bundles 915, 935, each multicomponent fiber bundle comprising two 44AWG copper conductors 920, 940, respectively, insulated with layered polyurethane and polyamide insulation, as the functional components, and one Tex 21 bonded Kevlar® yarn 910, 930, respectively, as the structural components, all braided over a core (not shown). Some of the yarns comprised a Tex 21 bonded Kevlar® yarn as the core, and some comprised a Permalloy (ferromagnetic) core. The size and material of the core was chosen to produce desired electromagnetic properties of the inductor and achieve the desired diameter of the braid. During construction, the two braider bobbins containing multicomponent fiber bundles 915, 935 traveled clockwise, while the two braider bobbins containing Kevlar® yarns 950, 960 traveled counterclockwise. The braid angle in this example is higher than those in Examples 1 and 2 in order to form a tighter coil, which increases the turns per length of the conductors, thereby increasing inductance. The core helped to stabilize the high braid angle yarn, which otherwise would change shape significantly under tension.

Example 7

Figure 10:
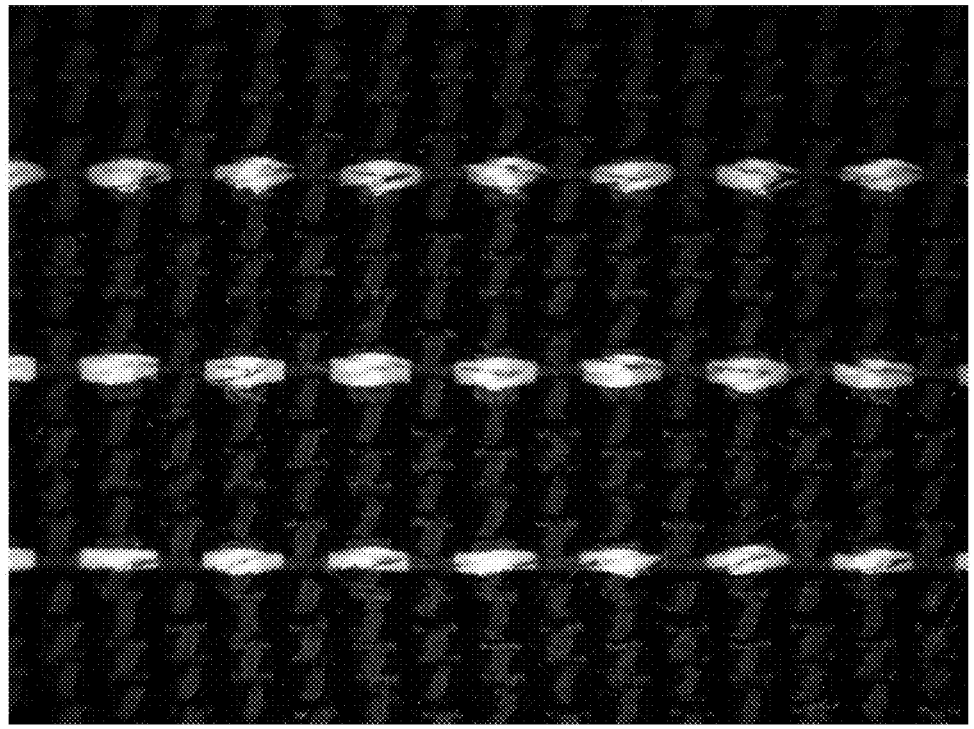
FIG. 10 is a photograph showing braided composite yarns of the present invention woven into a fabric.

FIG. 10 shows a woven fabric with three horizontal braided composite yarns selectively woven as weft yarns for use as data, power, and ground lines in the formation of textile-integrated circuits.

Example 8

Multifunctional multi-material braided composite yarns have been constructed for applications requiring both resistive joule heating and capacitive proximity sensing. The braided composite yarn was constructed using three multicomponent bundles, where two bundles each comprised one Tex 21 bonded Kevlar® yarn and one insulated 44AWG Cu55Ni45 alloy wire. The remaining multicomponent bundle comprised one Tex 21 bonded Kevlar® yarn and one insulated 44AWG copper conductor. The 44AWG Cu55Ni45 alloy wires were soldered together at one terminating end of the braided composite yarn using flux and $Sn_{96.5}Ag_{3.5}$ solder, thus enabling connection to the appropriate circuitry for resistive joule heating at the remaining terminating ends, forming a complete electrical circuit. The remaining 44AWG copper conductor was terminated to the appropriate circuitry at this same end of the braided composite yarn for use as a capacitive sensor for switching or other applications.

Example 9

Braided composite yarns with a 0.003" diameter superelastic Nitinol core have been constructed to form strain sensors. The yarn comprised three Tex 21 Kevlar® yarns and one multicomponent bundle comprising one Tex 21 bonded Kevlar® yarn and one 44AWG insulated conductor braided together around the Nitinol core. The Nitinol core was soldered to the 44AWG conductor at one terminating end of the braided composite yarn using flux and $Sn_{96.5}Ag_{3.5}$ solder. The electrical resistance between the remaining terminating ends of the Nitinol core and 44AWG insulated conductor was measured by the appropriate circuitry. The Tex 21 Kevlar® structural components and braid angle were chosen such that the maximum elongation of the braided composite yarn was no greater than 8%, to ensure consistent strain-resistance sensing response of the Nitinol core over its life. As the braided composite yarn elongated up to its mechanical limit of 8%, it demonstrated a predictable change in electrical resistance, thus exhibiting suitability for use as a strain sensor.

Example 10

Braided composite yarns have been constructed for applications requiring measurement of the yarn's extension for medical, body mapping, soft robotics, and other applications. These yarns exhibit a linear relationship between their elongation and the mutual capacitance between discreet conductors. The yarns can be constructed using intersecting insulated conductors or non-intersecting insulated or uninsulated conductors. As these yarns are elongated their diameter reduces predictably, thereby reducing the distance between the discreet conductors and increasing their mutual capacitance. This mutual capacitance then returns to its original value when the yarn is relaxed and returns to its original diameter. The yarns can be constructed using intersecting insulated conductors or non-intersecting insulated or uninsulated conductors. Their multicomponent fiber bundle constructions allow for stable and predictable yarn and conductor geometries throughout their lifetime.

Figure 11:
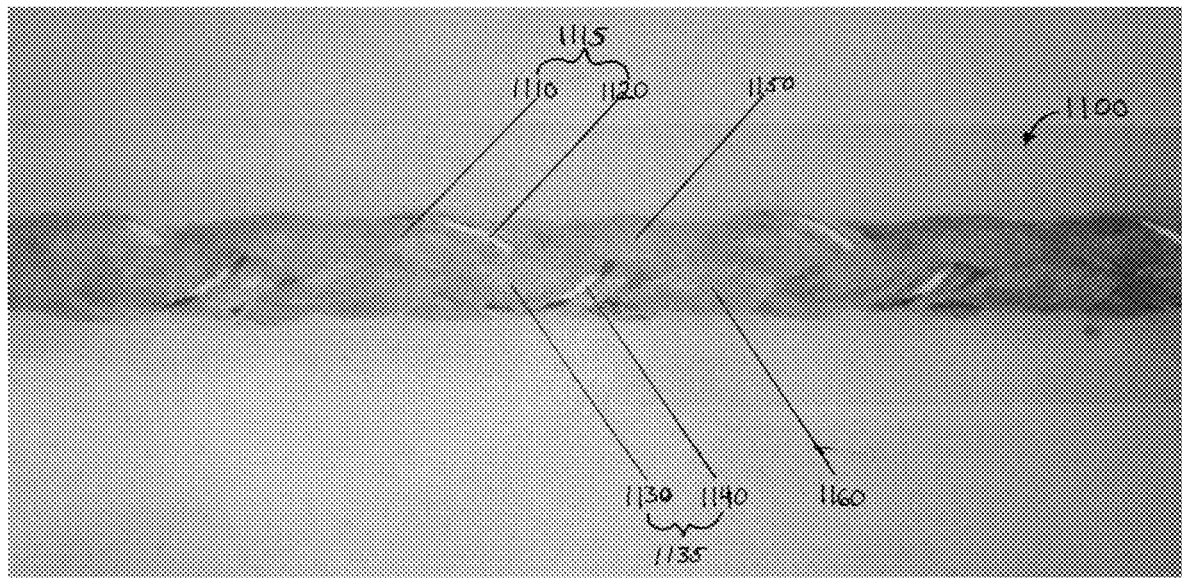
FIG. 11 is a photograph showing a braided composite yarn of the present invention configured for capacitive elongation sensing with intersecting insulated conductors.

FIG. 11 shows a braided composite yarn of the present invention configured for capacitive elongation sensing with intersecting insulated conductors. Braided composite yarn 1100 was braided from two Tex 21 bonded Kevlar® yarns 1150, 1160 and two multicomponent fiber bundles 1115, 1135, each multicomponent fiber bundle comprising one 40 AWG silver plated copper conductor 1120, 1140 respectively, insulated with 5 micron PTFE insulation, as the functional component, and one Tex 21 bonded Kevlar® yarn 1110, 1130 respectively as the structural component, all braided over an elastomeric core (not shown). The size and material of the core was chosen to produce the desired diameter and elastic characteristics of the braid. During construction, the two braider bobbins containing multicomponent fiber bundle 1115 and Kevlar® yarn 1150 traveled clockwise, while the two braider bobbins containing multicomponent fiber bundle 1135 and Kevlar® yarn 1160 traveled counterclockwise. This produced a construction in which the two multicomponent fiber bundles 1115, 1135 follow counter-helical paths.

Figure 12:
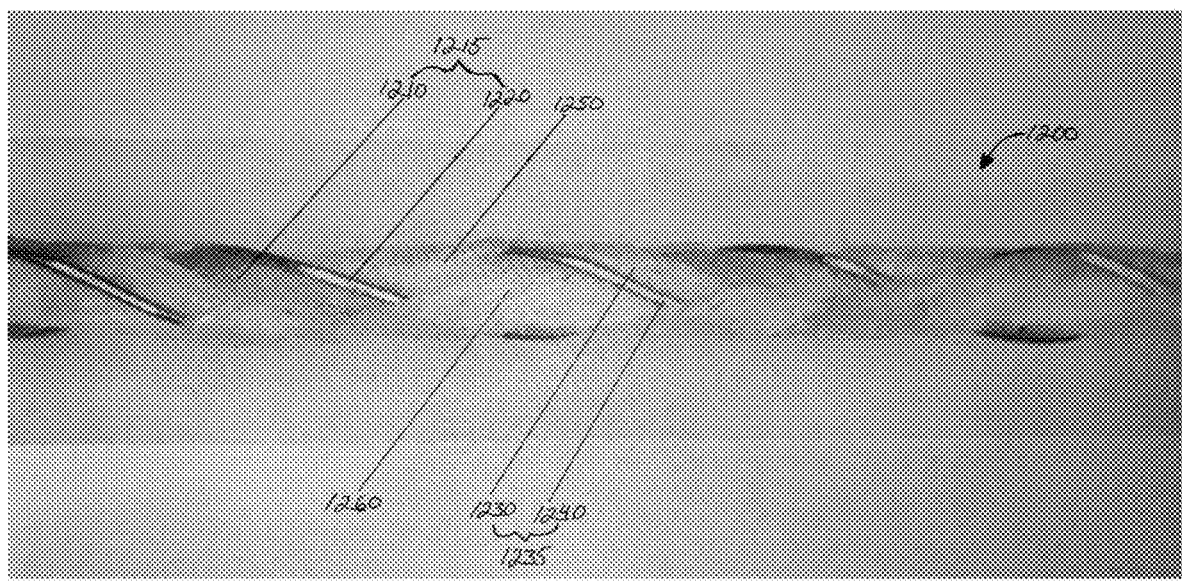
FIG. 12 is a photograph showing a braided composite yarn of the present invention configured for capacitive elongation sensing with non-intersecting insulated conductors.

FIG. 12 shows a braided composite yarn of the present invention configured for capacitive elongation sensing with non-intersecting insulated conductors. Braided composite yarn 1200 was braided from two transgenic spider silk yarns 1250, 1260 and two multicomponent fiber bundles 1215, 1235, each multicomponent fiber bundle comprising one 40 AWG silver plated copper conductor 1220, 1240 respectively, insulated with 5 micron PTFE insulation, as the functional component, and one transgenic spider silk yarn 1210, 1230 respectively as the structural component, all braided over an elastomeric core (not shown). The size and material of the core was chosen to produce the desired diameter and elastic characteristics of the braid. During construction, the two braider bobbins containing multicomponent fiber bundles 1215, 1235 traveled clockwise, while the two braider bobbins containing transgenic spider silk yarns 1250, 1260 traveled counterclockwise. This produced a construction in which the two multicomponent fiber bundles 1215, 1235 follow offset helical paths.

Example 11

Flat braided functional composite yarns comprising multicomponent fiber bundles both with and without elastomeric axial yarns were constructed. The mutual capacitance between any two conductors in these yarns increases approximately linearly as the yarn undergoes axial tension and resultant elongation or through-thickness compression. As the yarn is relaxed the mutual capacitance between conductor pairs decreases back to the baseline mutual capacitance. Through varying the braid pattern and the types, quantities, and sizes of materials incorporated, these yarns can be engineered to exhibit a broad range of kinematics, enabling their design for a multitude of strain and shape sensing applications.

Figure 13A:
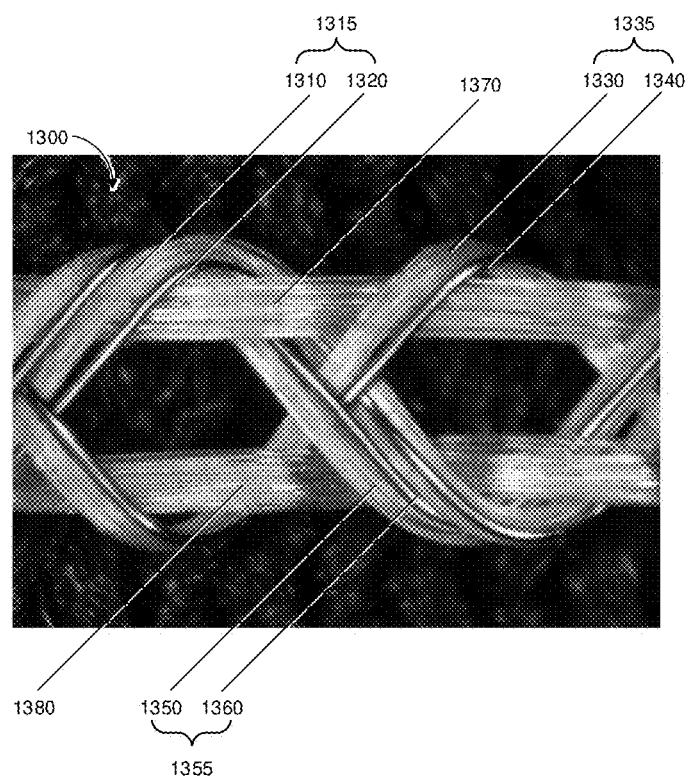
FIG. 13A shows a braided functional composite yarn of the present invention comprising three multicomponent fiber bundles as the bias yarns and two axial yarns.
Figure 13B:
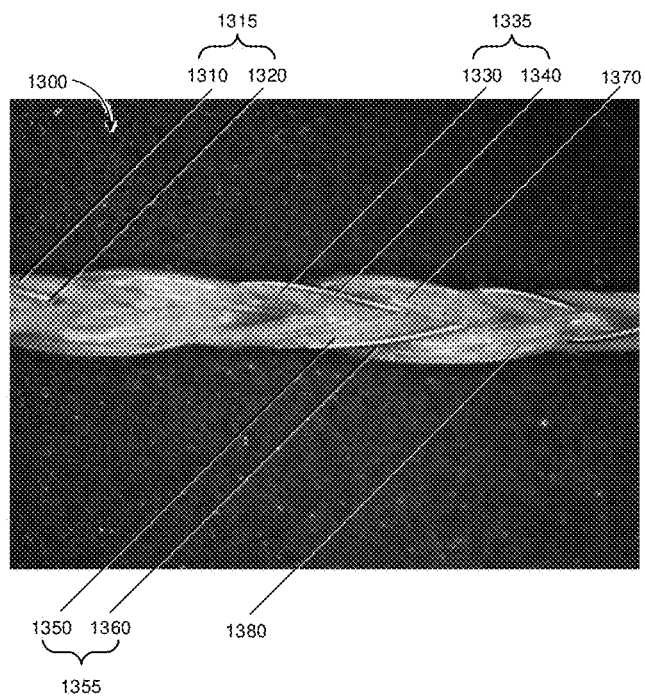
FIG. 13B shows the yarn of FIG. 13A in an elongated state.

FIG. 13A shows a flat braided functional composite yarn of the present invention that has a triaxial construction; that is, it comprises one or more axial or warp yarns. Braided composite yarn 1300 was braided using three multicomponent fiber bundles 1315, 1335, 1355 as the bias yarns, each multicomponent fiber bundle comprising one Tex 6.1 Technora® T242 yarn 1310, 1330, 1350 respectively and one 44AWG copper wire conductor insulated with layered polyurethane and polyamide insulation 1320, 1340, 1360 respectively, and two axial yarns of Prym® knitting-in elastic 1370, 1380. FIG. 13B shows yarn 1300 under axial tension such that it is maximally extended and in a jammed state. The average distance between conductors 1320, 1340, and 1360 decreases linearly with increased tension up to the yarn's maximum extensibility. By measuring the mutual capacitance between any two of the three conductors, this linear change in average distance between conductors can be indirectly measured, enabling the use of braided functional composite yarn 1300 as a strain-sensing device. An increase in the mutual capacitance between conductor pairs can also be observed when the yarn experiences through-thickness compression.

In other embodiments this braided functional composite yarn can be constructed with axial yarns which exhibit high dimensional stability and low elongation (i.e. that are not elastomeric), or alternatively with no axial yarns. In these embodiments, measurement of the mutual capacitance between conductor pairs still correlates to mechanical strain experienced by the yarn, but with a reduced dynamic range when compared with embodiments incorporating elastomeric or compressible materials.

Example 12

Flat triaxially braided functional composite objects have been constructed using multicomponent fiber bundles selectively integrated as bias yarns and axial yarns. The mutual capacitance between any two conductors in these narrow fabrics increases approximately linearly as the fabric undergoes axial tension and resultant elongation or through-thickness compression. As the braided object is relaxed the mutual capacitance between conductor pairs decreases back to the baseline mutual capacitance. Through varying the braid pattern and the types, quantities, and sizes of materials incorporated, these narrow fabrics can be engineered to exhibit a broad range of kinematics, enabling their design for a broad range of strain and shape sensing applications. The width of these functional objects can be scaled to wider widths through the use of larger braiding equipment and additional materials. By comparing the mutual capacitance between one or more conductors integrated on one or more bias yarns and conductors integrated on axial yarns that are disposed across the width of the braided object (i.e. in the direction transverse to the length of the axial yarns), one can determine the position or gradient along the width of the braided object of through thickness compression or twist experienced by the braided object. These objects can also be embedded into other material systems and maintain their sensing capabilities provided that the material system is sufficiently elastomeric to enable the conductors to maintain their ability to be displaced predictably relative to external strains so the braided object can continue to function as a sensor.

Figure 14A:
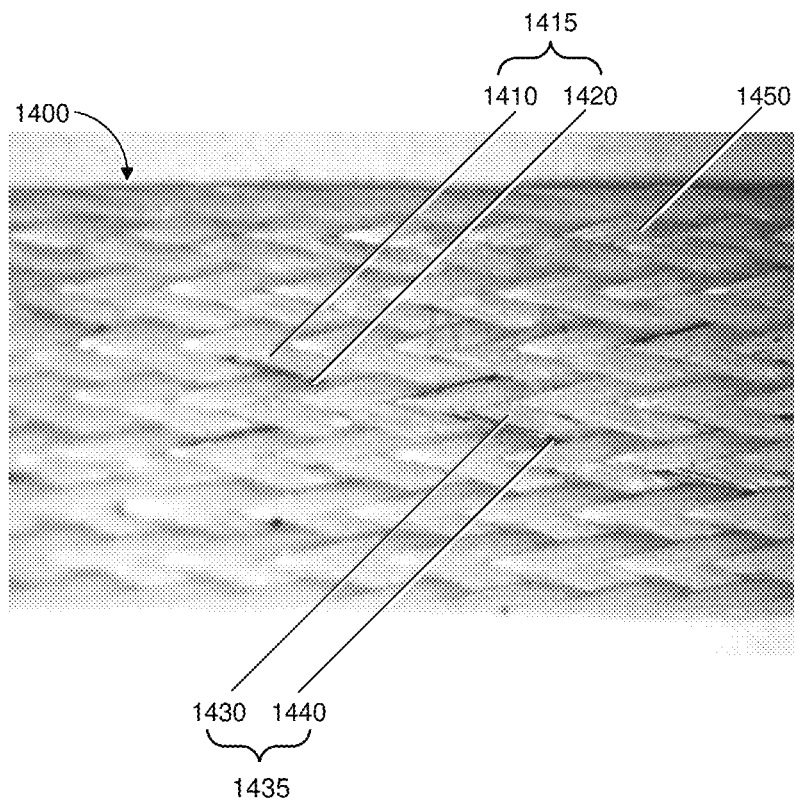
FIG. 14A shows a triaxially braided functional composite fabric of the present invention comprising multicomponent fiber bundles both as bias yarns and axial yarns.
Figure 14B:
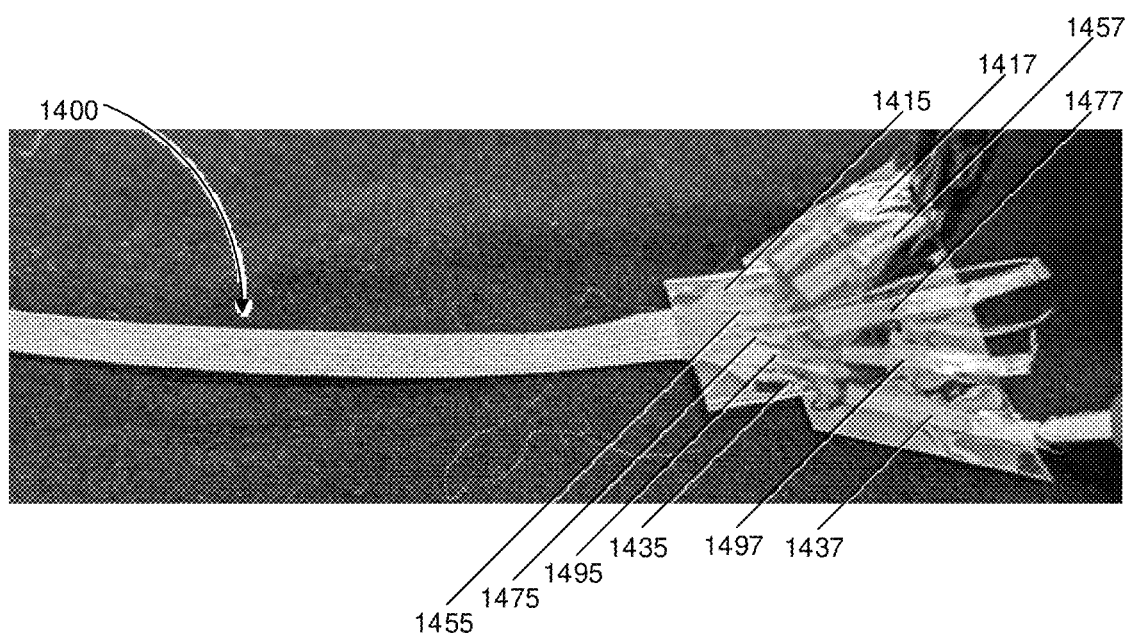
FIG. 14B shows the multicomponent fiber bundles in the fabric of FIG. 14A terminated for testing.

FIG. 14A shows a flat triaxially braided functional composite narrow fabric of the present invention. Braided composite fabric 1400 was braided with 33 bias yarns including thirty-one Tex 21 Kevlar® yarns 1450 and two multicomponent fiber bundles 1415, 1435, each multicomponent fiber bundle comprising one Tex 21 Kevlar® yarn 1410, 1430 respectively and one 44AWG copper wire insulated with layered polyurethane and polyamide insulation 1420, 1440 respectively. Braided composite fabric 1400 also comprised 14 axial yarns including eleven Tex 21 Kevlar® yarns and three multicomponent fiber bundles 1455, 1475, and 1495, each multicomponent fiber bundle comprising one Tex 21 Kevlar® yarn and one 44AWG copper wire insulated with layered polyurethane and polyamide insulation. FIG. 14B shows multicomponent fiber bundles 1415, 1435, 1455, 1475, 1495 terminated to copper foil using SAC305 solder to form test points 1417, 1437, 1457, 1477, and 1497 respectively.

Figure 15A:
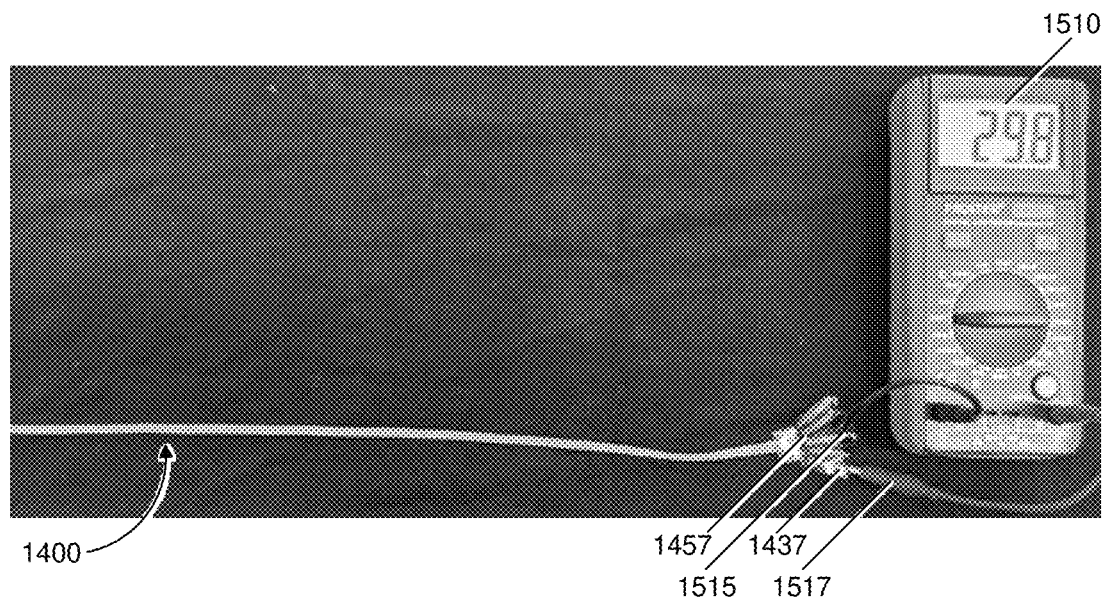
FIG. 15A shows the mutual capacitance of two of the multicomponent fiber bundles in the fabric of FIGS. 14A and 14B.
Figure 15B:
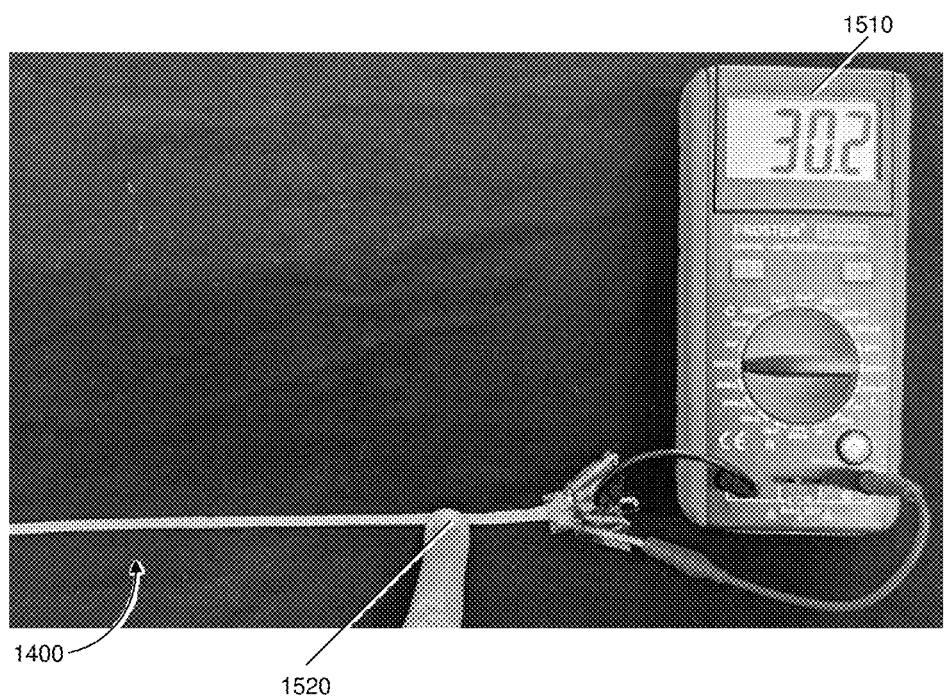
FIG. 15B shows an increase in the value of mutual capacitance over the value measured in FIG. 15A under compressive loading at a single point.
Figure 15C:
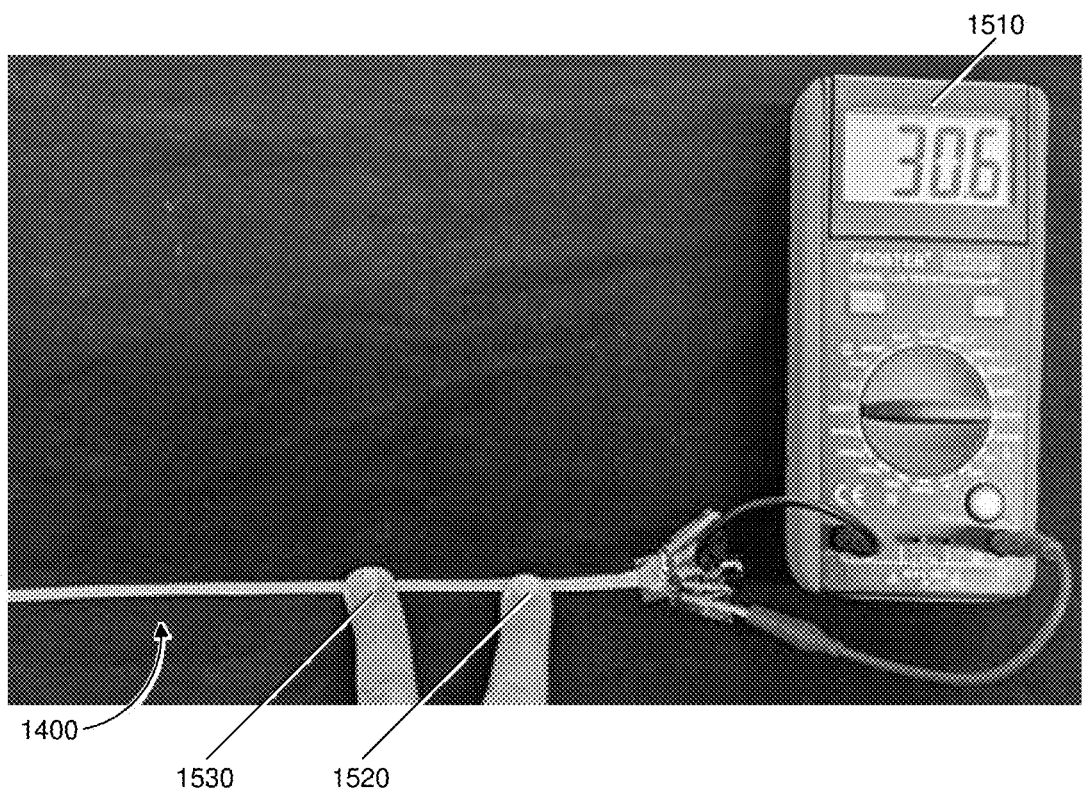
FIG. 15C shows an increase in the value of mutual capacitance over the value measured in FIG. 15A under simultaneous compressive loading at two points.
Figure 15D:
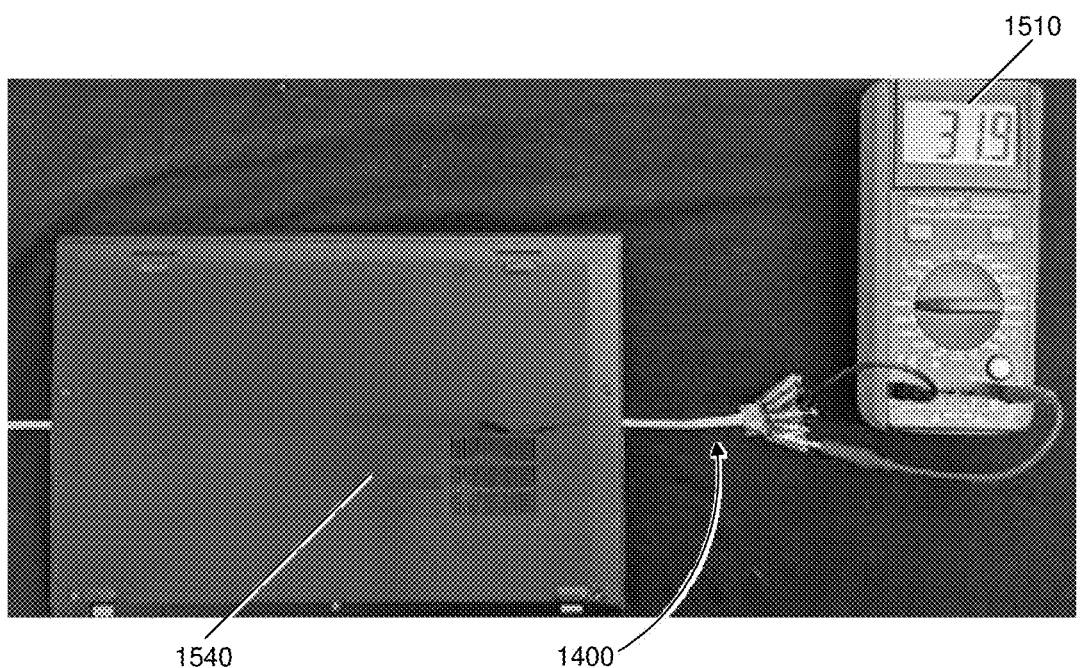
FIG. 15D shows an increase in the value of mutual capacitance over the value measured in FIG. 15A under compressive loading by a laptop.
Figure 15E:
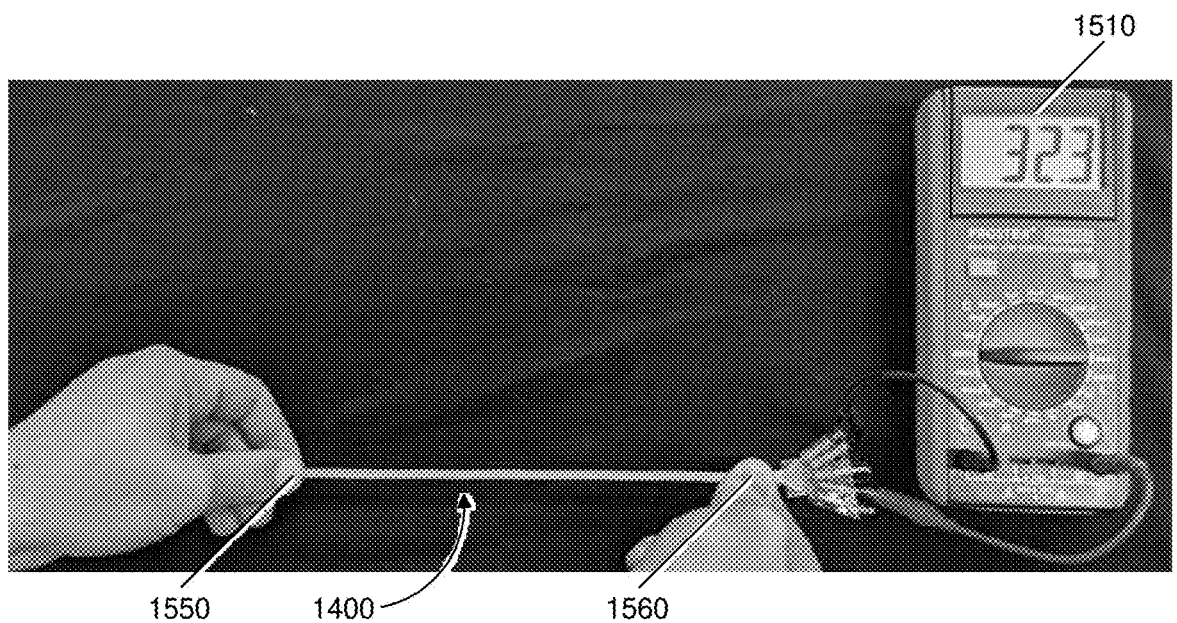
FIG. 15E shows an increase in the value of mutual capacitance over the value measured in FIG. 15A under tensile loading.

FIG. 15A shows braided composite fabric 1400 terminated to a Proster® LCR Multimeter 1510 using test leads 1515 and 1517 which are connected to test points 1457 and 1437 respectively. The mutual capacitance between the conductors contained within axially braided multicomponent fiber bundle 1455 and biaxially braided multicomponent fiber bundle 1435 is measured and displayed in picofarads on the Proster® LCR Multimeter 1510, showing a baseline value of 29.8 picofarads. FIG. 15B shows the same testing configuration as that described in FIG. 15A with compressive loading at point 1520 using a fingertip and downward pressure. Proster® LCR Multimeter 1510 measures and displays the mutual capacitance between the conductors contained within multicomponent fiber bundles 1455 and 1435 as 30.2 picofarads, demonstrating an increase of 0.4 picofarads when compared to the baseline reading of 29.8 picofarads at rest. FIG. 15C shows the simultaneous compressive loading at points 1520 and 1530 and a resultant mutual capacitance measurement of 30.6 picofarads, demonstrating an increase of 0.8 picofarads when compared to the baseline reading of 29.8 picofarads at rest. FIG. 15D shows the compressive loading of a 12.74" length of braided composite fabric 1400 using laptop 1540 with a weight of 2.4 lbs and a resultant mutual capacitance measurement of 31.9 picofarads, demonstrating an increase of 2.1 picofarads when compared to the baseline reading of 29.8 picofarads at rest. FIG. 15E shows tensile loading of braided composite fabric 1400 between points 1550 and 1560 and a resultant mutual capacitance measurement of 32.3 picofarads, demonstrating an increase of 2.5 picofarads when compared to the baseline reading of 29.8 picofarads at rest.

Figure 16A:
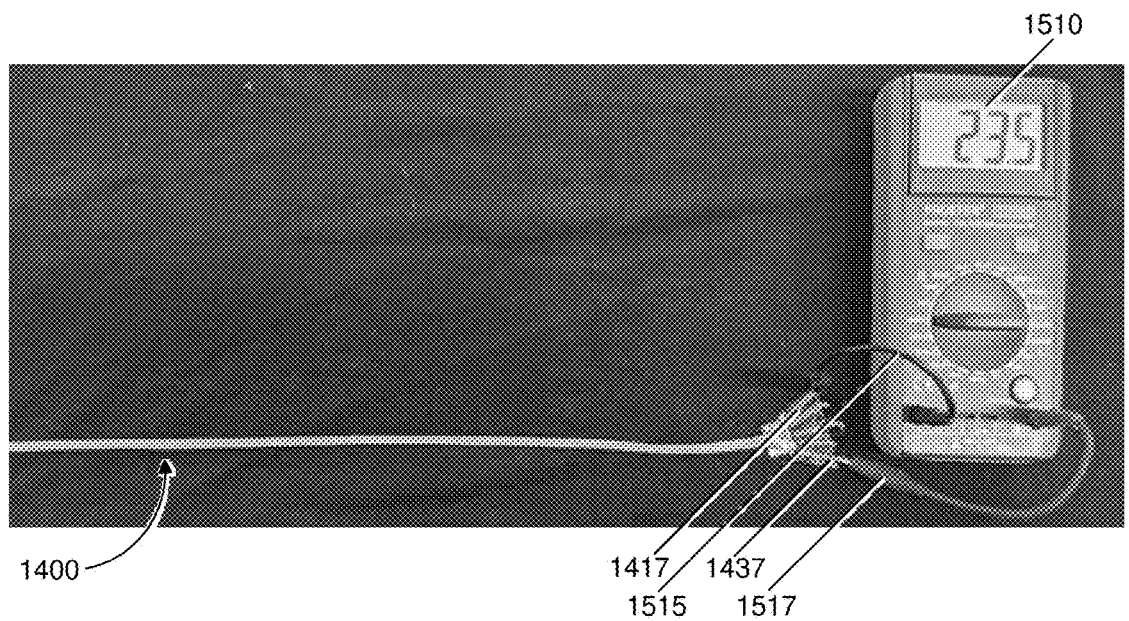
FIG. 16A shows the mutual capacitance of two different multicomponent fiber bundles in the fabric of FIGS. 14A and 14B.
Figure 16B:
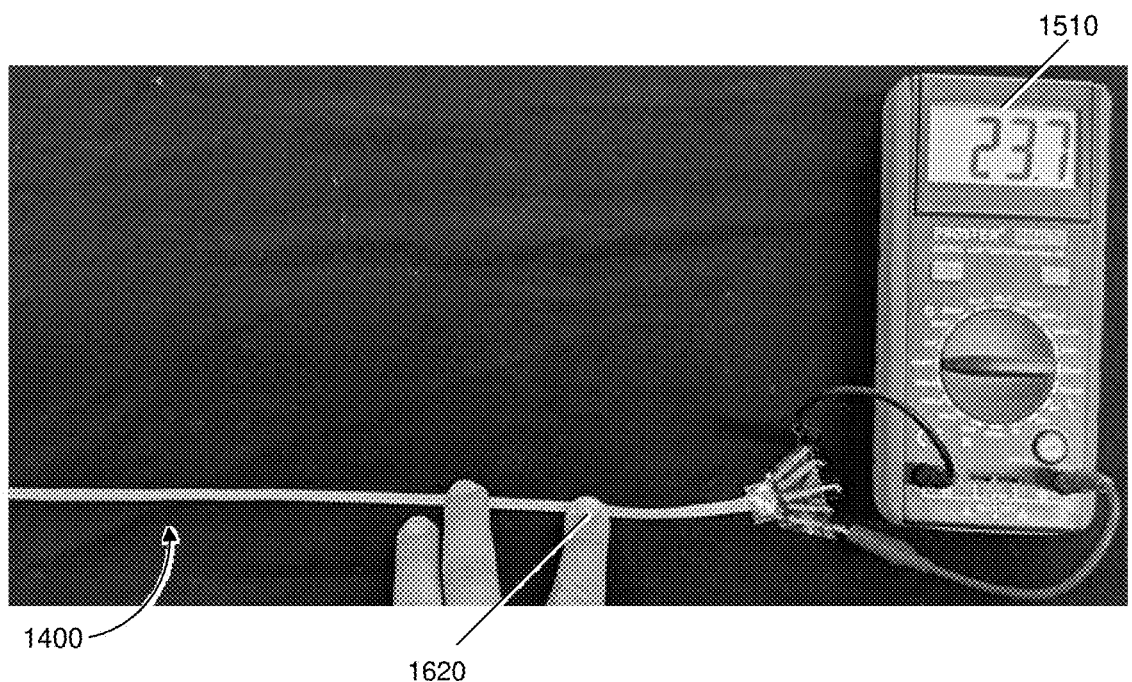
FIG. 16B shows an increase in the value of mutual capacitance over the value measured in FIG. 16A under compressive loading at a single point.
Figure 16C:
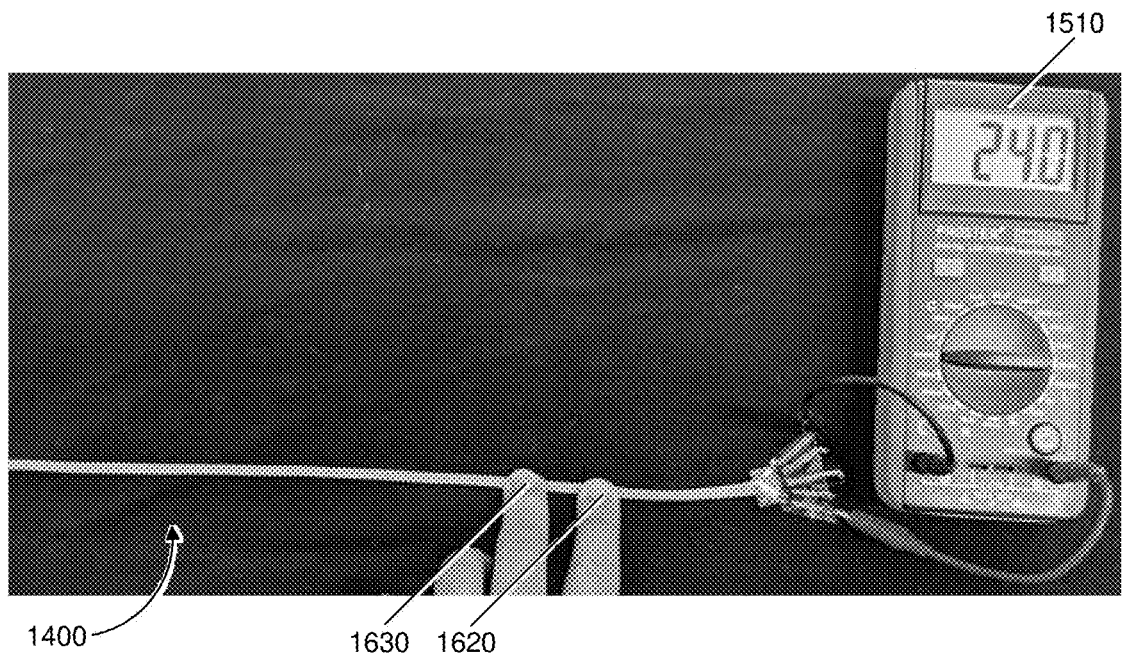
FIG. 16C shows an increase in the value of mutual capacitance over the value measured in FIG. 16A under simultaneous compressive loading at two points.
Figure 16D:
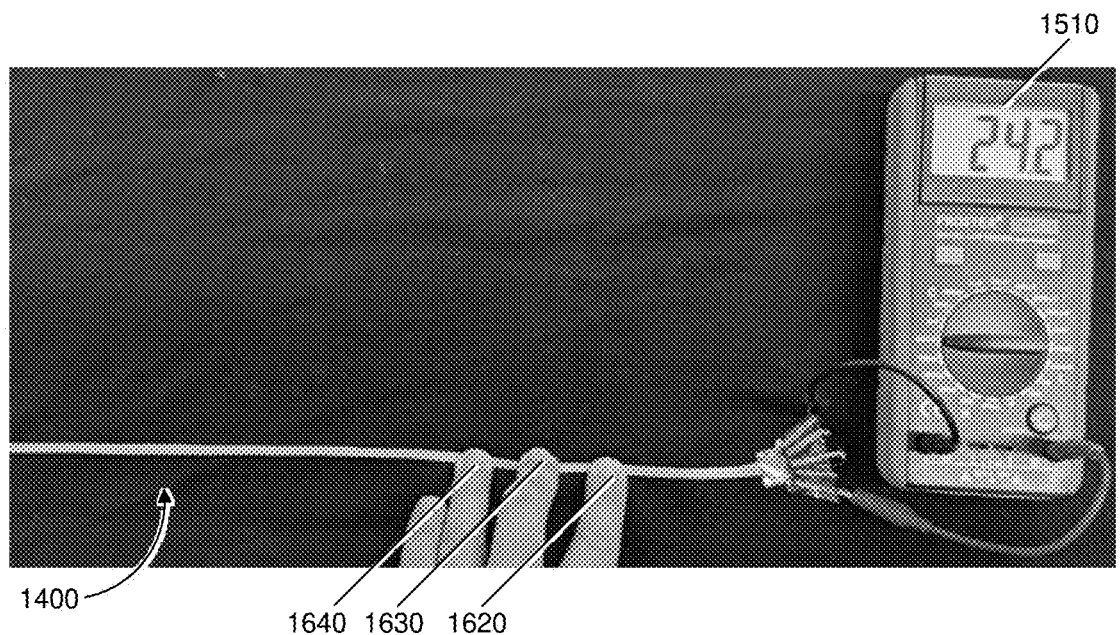
FIG. 16D shows an increase in the value of mutual capacitance over the value measured in FIG. 16A under simultaneous compressive loading at three points.

FIG. 16A shows braided composite fabric 1400 terminated to a Proster® LCR Multimeter 1510 using test leads 1515 and 1517 which are connected to test points 1417 and 1437 respectively. The mutual capacitance between the conductors contained within biaxially braided multicomponent fiber bundles 1415 and 1435 is measured and displayed in picofarads on the Proster® LCR Multimeter 1510, showing a baseline value of 23.5 picofarads. FIG. 16B shows the same testing configuration as that described in FIG. 16A with compressive loading at point 1620 using an adult fingertip and downward pressure. Proster® LCR Multimeter 1510 measures and displays the mutual capacitance between the conductors contained within multicomponent fiber bundles 1415 and 1435 as 23.7 picofarads, demonstrating an increase of 0.2 picofarads when compared to the baseline reading of 23.5 picofarads at rest. FIG. 16C shows the simultaneous compressive loading at points 1620 and 1630 and a resultant mutual capacitance measurement of 24.0 picofarads, demonstrating an increase of 0.5 picofarads when compared to the baseline reading of 23.5 picofarads at rest. FIG. 16D shows the simultaneous compressive loading at points 1620, 1630, and 1640 and a resultant mutual capacitance measurement of 24.2 picofarads, demonstrating an increase of 0.7 picofarads when compared to the baseline reading of 23.5 picofarads at rest.

In other embodiments, biaxial braids with selectively integrated multicomponent fiber bundles as the bias yarns can enable many of these same sensing characteristics at the expense of losing the ability to discriminate the latitudinal location of compressive loading or twisting. In other embodiments, a single multicomponent fiber bundle integrated as a bias yarn and a single multicomponent fiber bundle integrated as an axial yarn is sufficient to produce a functional braided composite capacitive strain-sensing yarn or fabric.

In any of the previous embodiments, conductors that are not components of a multicomponent fiber bundle may be substituted wherever multicomponent fiber bundles were actually used.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A triaxial composite braided object comprising one or more axial yarns and three or more braided bias yarns, wherein at least two of the bias yarns each comprise a multicomponent fiber bundle which comprises a conductive or capacitive functional component; and
   wherein the multicomponent fiber bundle comprises intersecting or non-intersecting insulated conductors.

2. The triaxial composite braided object of claim 1 comprising a plurality of axial yarns disposed across a width of the triaxial composite braided object.

3. The triaxial composite braided object of claim 2 wherein the axial yarns are approximately parallel.

4. The triaxial composite braided object of claim 2 capable of measuring compression and/or twist experienced by the triaxial composite braided object.

5. The triaxial composite braided object of claim 4 capable of providing a position or gradient along a width of the triaxial composite braided object of compression and/or twist experienced by the triaxial composite braided object.

6. The triaxial composite braided object of claim 4 wherein the compression and/or the twist changes a mutual capacitance between the two bias yarns comprising a multicomponent fiber bundle.

7. The triaxial composite braided object of claim 1 capable of measuring axial tension and/or elongation experienced by the triaxial composite braided object.

8. The triaxial composite braided object of claim 7 wherein a bias angle of the bias yarns changes under axial tension and/or elongation of the triaxial composite braided object, thereby narrowing the triaxial composite braided object.

9. The triaxial composite braided object of claim 8 where the axial tension and/or elongation changes a mutual capacitance between two axial yarns, two bias yarns, or one bias yarn and one axial yarn, each such yarn comprising a multicomponent fiber bundle.

10. A composite braided object comprising three or more braided bias yarns, wherein at least two of the bias yarns each comprise a multicomponent fiber bundle which comprises a conductive or capacitive functional component; and
    wherein the multicomponent fiber bundle comprises intersecting or non-intersecting insulated conductors.

11. The composite braided object of claim 10 comprising at least one elastomeric core.

12. The composite braided object of claim 10 capable of measuring axial tension and/or elongation experienced by the composite braided object.

13. The triaxial composite braided object of claim 12 wherein a bias angle of the bias yarns changes under axial tension and/or elongation of the composite braided object, thereby narrowing the composite braided object.

14. The composite braided object of claim 13 where the axial tension and elongation changes a mutual capacitance between the two bias yarns each comprising a multicomponent fiber bundle.

* * * * *